(12) United States Patent
Jacobsen et al.

(10) Patent No.: US 9,310,613 B2
(45) Date of Patent: *Apr. 12, 2016

(54) MOBILE WIRELESS DISPLAY FOR ACCESSING DATA FROM A HOST AND METHOD FOR CONTROLLING

(71) Applicant: Kopin Corporation, Westborough, MA (US)

(72) Inventors: Jeffrey J. Jacobsen, Hollister, CA (US); Stephen A. Pombo, Campbell, CA (US); Christopher Parkinson, Richland, WA (US)

(73) Assignee: Kopin Corporation, Westborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/807,543

(22) Filed: Jul. 23, 2015

(65) Prior Publication Data

US 2015/0334218 A1 Nov. 19, 2015

Related U.S. Application Data

(63) Continuation of application No. 12/152,462, filed on May 14, 2008, now Pat. No. 9,116,340.

(60) Provisional application No. 61/010,090, filed on Jan. 4, 2008, provisional application No. 60/930,232, filed on May 14, 2007.

(51) Int. Cl.
*G09G 5/00* (2006.01)
*G02B 27/01* (2006.01)
*G06F 3/14* (2006.01)

(52) U.S. Cl.
CPC .............. *G02B 27/017* (2013.01); *G06F 3/14* (2013.01); *G09G 5/005* (2013.01); *G09G 2370/12* (2013.01); *G09G 2370/16* (2013.01)

(58) Field of Classification Search
CPC .............................. G02B 27/017; G09G 5/005
See application file for complete search history.

(56) References Cited

U.S. PATENT DOCUMENTS 5,990,793 A 11/1999 Bieback
6,010,216 A 1/2000 Jesiek
(Continued)

FOREIGN PATENT DOCUMENTS

WO WO 95/21408 8/1995
WO WO 95/23994 9/1995
(Continued)

OTHER PUBLICATIONS

International Search Report for International Application No. PCT/US2008/06147, entitled "Mobile Wireless Display for Accessing Data From a Host and Method for Controlling" dated Jul. 16, 2008.
(Continued)

*Primary Examiner* — David Bilodeau
(74) *Attorney, Agent, or Firm* — Hamilton, Brook, Smith & Reynolds, P.C.

(57) ABSTRACT

An apparatus includes a monocular display with a wireless communications interface, a user input device, a transmitter, and a controller. The monocular display is positioned relative to the user's eye to display images to the user while occluding less than half of the user's maximum viewing space. The apparatus can incorporate a wireless communication controller that not only provides a video link to a host device, but also provides for control and management of a host device and other more devices. In this context, a host device may be any appropriate device that sources audio, video, text, office functionality and other information, such as a cell phone, personal computer, laptop, media player, and/or the like. The apparatus and the host may support Microsoft Windows SideShow, Remote Desktop Protocol (RDP), and Virtual Network Computing (VNC).

20 Claims, 12 Drawing Sheets

(56) References Cited

U.S. PATENT DOCUMENTS

| | | |
|---|---|---|
| 6,084,556 A | 7/2000 | Zwern |
| 6,108,197 A | 8/2000 | Janik |
| 6,204,974 B1 | 3/2001 | Spitzer |
| 6,535,854 B2 | 3/2003 | Buchner et al. |
| 6,798,391 B2 | 9/2004 | Peterson, III |
| 6,853,293 B2 | 2/2005 | Swartz et al. |
| 6,900,777 B1 | 5/2005 | Hebert et al. |
| 6,922,184 B2 | 7/2005 | Lawrence et al. |
| 6,956,614 B1 | 10/2005 | Quintana, et al. |
| 7,004,582 B2 | 2/2006 | Jannard et al. |
| 7,082,393 B2 | 7/2006 | Lahr |
| 7,147,324 B2 | 12/2006 | Jannard et al. |
| 7,150,526 B2 | 12/2006 | Jannard et al. |
| 7,213,917 B2 | 5/2007 | Jannard et al. |
| 7,216,973 B2 | 5/2007 | Jannard et al. |
| 7,219,994 B2 | 5/2007 | Jannard et al. |
| 7,249,846 B2 | 7/2007 | Grand et al. |
| 7,278,734 B2 | 10/2007 | Jannard et al. |
| 7,302,465 B2 | 11/2007 | Ayres et al. |
| 7,331,666 B2 | 2/2008 | Swab et al. |
| 7,445,332 B2 | 11/2008 | Jannard et al. |
| 7,452,073 B2 | 11/2008 | Jannard et al. |
| 7,458,682 B1 | 12/2008 | Lee |
| 7,461,936 B2 | 12/2008 | Jannard |
| 7,494,216 B2 | 2/2009 | Jannard et al. |
| 7,512,414 B2 | 3/2009 | Jannard et al. |
| 7,620,432 B2 | 11/2009 | Willins et al. |
| 7,648,236 B1 | 1/2010 | Dobson |
| 7,682,018 B2 | 3/2010 | Jannard |
| 7,711,103 B2 | 5/2010 | Culbertson et al. |
| 7,740,353 B2 | 6/2010 | Jannard |
| 7,744,213 B2 | 6/2010 | Jannard et al. |
| 7,753,520 B2 | 7/2010 | Fuziak, Jr. |
| 7,760,898 B2 | 7/2010 | Howell et al. |
| 7,798,638 B2 | 9/2010 | Fuziak, Jr. |
| 7,806,525 B2 | 10/2010 | Howell et al. |
| 7,918,556 B2 | 4/2011 | Lewis |
| 7,966,189 B2 | 6/2011 | Le et al. |
| 7,967,433 B2 | 6/2011 | Jannard et al. |
| 7,969,383 B2 | 6/2011 | Eberl et al. |
| 7,969,657 B2 | 6/2011 | Cakmakci et al. |
| 7,976,480 B2 | 7/2011 | Grajales et al. |
| 7,988,283 B2 | 8/2011 | Jannard |
| 8,020,989 B2 | 9/2011 | Jannard et al. |
| 8,025,398 B2 | 9/2011 | Jannard |
| 8,072,393 B2 | 12/2011 | Riechel |
| 8,098,439 B2 | 1/2012 | Amitai et al. |
| 8,140,197 B2 | 3/2012 | Lapidot et al. |
| 8,184,983 B1 | 5/2012 | Ho et al. |
| 8,212,859 B2 | 7/2012 | Tang et al. |
| 8,825,468 B2 | 9/2014 | Jacobsen et al. |
| 8,929,954 B2 | 1/2015 | Jacobsen et al. |
| 9,116,340 B2 | 8/2015 | Jacobsen et al. |
| 2002/0015008 A1 | 2/2002 | Kishida et al. |
| 2002/0030649 A1 | 3/2002 | Zavracky et al. |
| 2002/0094845 A1 | 7/2002 | Inasaka |
| 2003/0017846 A1 | 1/2003 | Estevez et al. |
| 2003/0028380 A1 | 2/2003 | Freeland et al. |
| 2003/0068057 A1 | 4/2003 | Miller et al. |
| 2004/0156114 A1 | 8/2004 | Sayed et al. |
| 2005/0125840 A1 | 6/2005 | Anderson et al. |
| 2005/0136958 A1 | 6/2005 | Scshadri et al. |
| 2005/0192811 A1 | 9/2005 | Parks et al. |
| 2005/0219152 A1 | 10/2005 | Budd et al. |
| 2005/0264527 A1 | 12/2005 | Lin |
| 2006/0028400 A1 | 2/2006 | Lapstun et al. |
| 2006/0122840 A1 | 6/2006 | Anderson et al. |
| 2006/0132382 A1 | 6/2006 | Jannard |
| 2006/0212611 A1 | 9/2006 | Fujii et al. |
| 2006/0221266 A1 | 10/2006 | Kato et al. |
| 2007/0218987 A1 | 9/2007 | Van Luchene et al. |
| 2008/0055194 A1 | 3/2008 | Baudino et al. |
| 2008/0198324 A1 | 8/2008 | Fuziak |
| 2009/0099836 A1 | 4/2009 | Jacobsen et al. |
| 2009/0128448 A1 | 5/2009 | Riechel |
| 2009/0154719 A1 | 6/2009 | Wulff et al. |
| 2009/0180195 A1 | 7/2009 | Cakmakci et al. |
| 2009/0251409 A1 | 10/2009 | Parkinson et al. |
| 2010/0020229 A1 | 1/2010 | Hershey et al. |
| 2010/0171680 A1 | 7/2010 | Lapidot et al. |
| 2010/0271587 A1 | 10/2010 | Pavlopoulos |
| 2011/0001699 A1 | 1/2011 | Jacobsen et al. |
| 2011/0187640 A1 | 8/2011 | Jacobsen et al. |
| 2011/0254698 A1 | 10/2011 | Eberl et al. |
| 2011/0255050 A1 | 10/2011 | Jannard et al. |
| 2012/0013843 A1 | 1/2012 | Jannard |
| 2012/0068914 A1 | 3/2012 | Jacobsen et al. |
| 2012/0075177 A1 | 3/2012 | Jacobsen et al. |
| 2012/0105740 A1 | 5/2012 | Jannard et al. |
| 2014/0368412 A1 | 12/2014 | Jacobsen et al. |

FOREIGN PATENT DOCUMENTS

| | | |
|---|---|---|
| WO | WO 00/79327 | 12/2000 |
| WO | WO 2009/076016 | 6/2009 |

OTHER PUBLICATIONS

International Preliminary Report on Patentability from PCT/US2008/006147, entitled "Mobile Wireless Display for Accessing Data From a Host and Method for Controlling" dated Apr. 28, 2011.

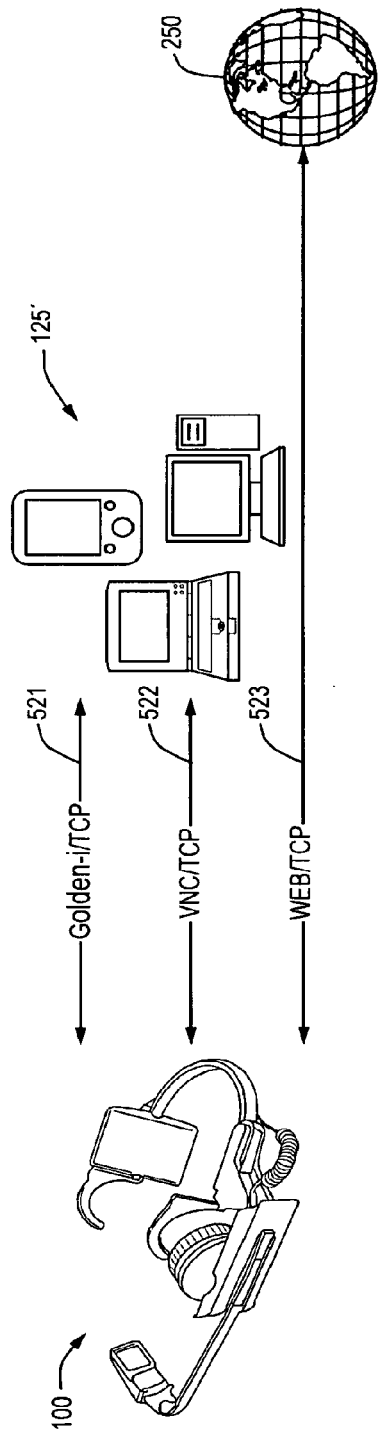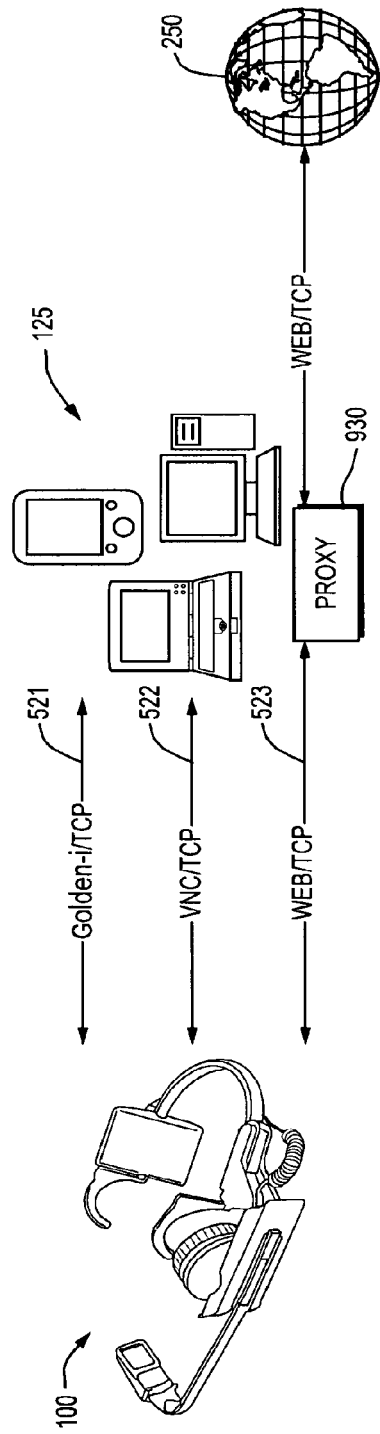

MOBILE WIRELESS DISPLAY FOR ACCESSING DATA FROM A HOST AND METHOD FOR CONTROLLING

CROSS REFERENCE TO RELATED PATENT APPLICATIONS

This application is a continuation of Ser. No. 12/152,462 filed May 14, 2008 which claims the benefit of U.S. Provisional Application No. 61/010,090, filed Jan. 4, 2008, and U.S. Provisional Application No. 60/930,232, filed May 14, 2007. This application also relates to U.S. patent application Ser. No. 12/008,114, filed Jan. 8, 2008, and U.S. patent application Ser. No. 12/008,104, filed Jan. 8, 2008. The entire teachings of the above applications are incorporated herein by reference.

BACKGROUND OF THE INVENTION

Recent technology convergence between mobile cellular telephones and digital media players, such as with the iPhone™ are increasingly placing small, portable devices capable of storing large amounts of video and other content in the hands of consumers. While these handheld devices typically include a video screen, the visual experience for high resolution, a large format display could never be replicated in such a device, simply because of the physical size limitations expected of a handheld unit.

Head-worn display devices are known in the art. Typically, the display is a small color monitor arranged to present images to a user's left eye, right eye, or both. These devices often surround the user's face or head and thus not only are heavy but also occlude substantially all of the user's vision. In other words, while wearing the display, the user generally cannot easily view other objects in the user's normal peripheral vision or loses substantial portions of normal peripheral vision during use. Other head worn displays may include two separate displays, one for each eye, that are also supported on a heavy frame.

As a result, consumers are now seeking high-quality, portable, color displays to augment their handheld video devices. One such display is worn on the user's face or head similar to a pair of eyeglasses or headphones. Through recent dramatic developments in optical technologies, these devices can provide the appearance of a large format, high resolution display.

One example of such a device is found in U.S. Pat. No. 7,088,234 issued to Naito, et al. and assigned to Matsushita Electrical Industries. The wearable information device described in that patent can display certain information to notify the user, e.g., information about arrival of an e-mail, etc.

Another such device is described in U.S. Pat. No. 7,158, 096 issued to Spitzer and assigned to MyVu Corporation. That device includes a projection type display attached to one end of a head-mountable support. An eyepiece assembly is attached to a second end of the support. The support maintains the projection system and the eyepiece assembly in alignment along an optical path.

While these devices can provide a high-resolution display of images and sound, occlusion of the user's normal viewing space, or a majority thereof can be problematic. The user will use the display in a few, select locations where that user perceives the location to be safe, for example, in a living room, elsewhere in the home, in a work space, while seated or standing in a substantially fixed location. Users cannot efficiently perform many other day-to-day tasks when wearing an occlusive display device. The day-to-day tasks can include participating in activities requiring moderate to high personal mobility, requiring frequent depth perception adjustments, moving through areas with irregular and uneven surfaces or requiring active collision avoidance. Some different day-to-day tasks may also include personally moving through areas with constantly changing obstacles, crowds, avoiding fast moving objects that may be encountered, tasks while operating vehicles, negotiating the use of public transportation, or any circumstance where personal safety can be sacrificed by a loss of normal peripheral vision. Users would enjoy using such a device for completing these day-to-day tasks in a safe manner that increases productivity.

Secondly, such prior art head worn displays are limiting in the overall functions that can be performed. Such tasks can include viewing images, graphics, or movies with audio. This can be for gaming purposes or recreational viewing of images from a television broadcast or video. Such prior art head worn displays are severely limited in connection with other day-to-day desired functional computing tasks. For example, the user may desire to use the display in connection with communication tasks, web browsing, running business applications, active navigation tasks, mobile instruction with real time updates or using the display to wirelessly control other devices that the user regularly uses (or comes in contact with) on a day-to-day basis. These secondary devices can include a Personal Digital Assistant (PDA), a notebook computer, a desktop computer, a mobile phone, a vehicle, a wireless network, devices associated with a wireless service hot spot, a thin client, or other electronic devices or appliances. Such prior art head worn displays often cannot interface with (or slave) such devices to initiate and control running programs, initiate real time device functional changes, alter real time device operational parameters, enable local or remote wireless communication with mobile devices and/or otherwise perform wireless networks and services.

Thirdly, such prior art devices are not readily upgradeable to provide other functions that the user may desire. A user may desire, in some locations, to have some functional attributes of a particular software application or a particular hardware configuration, while in other locations the user may not desire to have those software applications or hardware configurations. In fact, the user may not use such a heavy display device with multiple heavy hardware configurations, and additional connections and drives and instead may wish to remove unnecessary hardware from the device so the device remains lightweight.

Fourth, users would enjoy more compact mobile devices that can access important data that are lightweight, and do not require users to carry relatively larger, and bulkier computers, such as notebook computers, laptops, tablet computing devices, or relatively larger media players. Additionally, users, when they do carry their laptops, often have to flip the laptop open, then boot the machine, which takes time. This is disfavored, especially, when the user wants a specific information quickly, such as, an address, e-mail, or relevant text from an e-mail attachment, while traveling.

Microsoft Windows SideShow® is a software program that is in an operating system (OS) that supports a secondary screen on a mobile personal computer, such as a laptop computer, that is generally disposed on the rear of the laptop cover. With this additional secondary display, a user can access the Microsoft Windows SideShow® software program to display images on the secondary display while the computer is in sleep mode or turned on or off.

Microsoft Windows SideShow® uses convenient mini programs called Gadgets. These Gadget programs extend information from the laptop to other devices. Gadgets can run on computers operating with Microsoft Windows SideShow® compatible device and update that device with information from the computer. Gadgets may allow viewing of information from the computer regardless of whether it is on, off, or in sleep mode. This saves power and a user's time by not requiring booting of the computer.

These gadget software programs are limiting and users desire a software gadget that permits wireless access to the laptop computer without the need to use any input device to continuously monitor. Additionally, users desire great amounts of information from the computer while the laptop computer, or PC, is on, off, or in sleep mode.

SUMMARY OF THE INVENTION

Accordingly, there is a need in the art for lightweight device that can interrogate other computing devices to form a wireless link and that can receive and exchange data between a monocular display device and a computing device. There is also a need in the art for a monocular display device that can act as a redundant auxiliary monocular display screen for a computing device so the user can access data from the computing device from the redundant auxiliary display screen using an input device in a master-slave networking relationship.

According to a first embodiment of the present disclosure, there is provided a monocular display device that has a monocular display configured to be worn by a wearer. The monocular display is configured to be worn so the display is located in a peripheral vision of the wearer and occludes less than half of a normal vision of the wearer. The device also has a wireless interface connected to the monocular display, which is configured to wirelessly communicate with a host computing system.

The host computing system has a primary display that receives a control signal from the host computing system to display images. The control signal is communicated to a second host wireless interface. The control signal is transmitted from the second wireless host interface to the wireless interface. The signal is then transmitted to the monocular display to display images on the monocular display. The monocular display is located remote from the host computing system.

The monocular display may be removably connected to a head of the wearer, and can have an input device that is connected to a monocular display processor. The input device communicates with the host computing device. The monocular display device may also be configured so the host computer further communicates with an Internet Service Provider for displaying images relating to an Internet webpage on the monocular display device. The monocular display device can be configured so that it includes a wireless interface with a transmitter and a receiver for transmitting and receiving radiofrequency signals to, and from, the host computing device. The monocular display device may include a display housing. The housing can be pivotally connected to a display body, and the display body can be supported on the wearer.

The monocular display device can also be configured so radiofrequency signals are transmitted to, and from, the host computing device using a short range wireless communication protocol. In another embodiment, the radiofrequency signals are transmitted using a long range wireless protocol.

The monocular display device can be further configured so the host computing device uses a mobile telephone network compatible wireless protocol to receive and transmit data with the monocular display device. The data is communicated to the monocular display device using the wireless communication interface. In yet another embodiment, the host computing device further may communicate with a broadcast video provider. In this embodiment, the provider data is received to display images relating to the video provider on the monocular display device.

In yet another embodiment, the host computer further may communicate with a broadcast television provider for receiving broadcast video from the provider and displaying broadcast television on the monocular display device. The host computing device can be a laptop computer, a desktop computer, or at least one of a Personal Digital Assistant, a media player, a video disc player, a global positioning system, or any computerized diagnostic equipment. Host computing device can also be a cellular telephone, a mobile phone, a Smartphone, or any mobile communication device.

The monocular display device further may include an audio playback device that is also connected to the wireless interface, and that wirelessly communicates with the host computing system. The host computing system may have a primary audio playback device that receives the control signal from the host computing system and that is configured to play back audio at the monocular display device. The control signal is communicated to the second host wireless interface and transmitted from the second wireless host interface to the audio playback device. The signal is converted to a suitable format to play audio on the audio play back device, which is located remote from the host computing system. The audio playback device may comprise a speaker. The host computing device may be at least one of a music player, a device for playing broadcast audio, a mobile phone, or a media player.

The monocular display device preferably can access any functions that are desired by the wearer from other remote devices in a wireless manner using a wireless interface so the lightweight device is preserved.

According to another embodiment of the present disclosure, there is provided a method for display images to a viewer. The method includes providing a display that is configured to be worn by the viewer and located in the peripheral vision of the viewer. The display occludes about less than half of a normal vision of the viewer. The method provides a control signal to a host computing system. The control signal is for displaying video on a primary display associated with the host computing system. A control signal is transmitted wirelessly from the host computing system to the display to display images on the monocular display remote from the host system. An audio device can be provided with the display. The audio device can also be configured to be worn by the viewer with the monocular display device. A control signal may be transmitted from the host computing system to the audio device to play audio remote from the host computing system so the wearer can enjoy multimedia content.

In yet another aspect of the present disclosure, there is provided a monocular display device that is configured to be used in combination with a host system, and including a host processor, a host memory, and a host bus. The host bus is connected to the host processor and the host memory. The host bus further is connected to a host wireless communication interface.

The monocular display device includes a monocular display. The display is configured to be worn by a wearer so the monocular display is located in substantially the peripheral vision of the wearer and the display occludes less than half of a normal vision of the wearer, when worn. The monocular display device controller is also coupled to the monocular display.

A monocular display device wireless communications interface provides for communication with the host wireless communication interface. The device also has a monocular display device input device. The input device is connected to the monocular display device controller. The monocular display device controller is configured to control the wireless interface to send a control signal to the host computing system via the wireless interface. The host wireless interface receives the control signal from the wireless interface to link the wireless interface to the host wireless communication interface, and to form a bi-directional communication path.

The device has the input device communicating with the host processor through the path. This provides an input to the host processor. The host system includes a primary display. The primary display receives a control video signal to display images.

The host also has a primary audio device. The primary audio device also receives the control signal to play back audio on the primary audio device. The control signal is communicated from the host wireless interface to the wireless communication interface. The signal is communicated then to the monocular display and the audio device. The monocular display and audio device play back multimedia including images and audio in a location, which is remote from the host computing system.

In most prior art arrangements, a video headset is connected to a base electronics unit by means of a wire. While this provides a secure communication link with sufficient bandwidth to transport a high quality video signal, the need for a wire limits the mobility of the user. A wireless headset, on the other hand, provides greater convenience and mobility and avoids the problem of broken connecting wires and the like.

Furthermore, it is desirable for such a video headset to provide additional functionality beyond operating as a simple display device. For example, a wireless headset can incorporate a wireless communication controller that not only provides a video link to a host device, but also provides for control and management of a host device and other more devices. In this context, a host device may be any appropriate device that sources audio, video, text, and other information, such as a cell phone, personal computer, laptop, media player, and/or the like.

In general, the functional aspects of such a wireless headset include a user interface, a hardware interface, a wireless communication link, such as a Bluetooth™ interface, devices drivers associated with each of the desired controllable host types, device content, and other support functions, such as a Software Developers Kit (SDK) that allows for creation of applications for the platform.

In one particular embodiment, the user interface may consist of a device browser application that provides a user interface with menus, icons, and the ability to select operations thereon. Additional aspects needed to support the device browser application can include a base operating system kernel, such as a Windows CE, Windows Mobile or Linux kernel, drawing primitive functions, and windowing tool kit. The device browser application may also support your interfaces, such as a speech input application, a Windows SideShow application, a Virtual Network Computing (VNC) client application, Remote Desktop Protocol (RDP) and a web browser application and other common applications.

In still further detail of specs, the wireless interface may be implemented on a Bluetooth™ physical layer with a Bluetooth™ proxy which implements a packet switching gateway function between multiple device browser applications requiring multiple connection or sockets. This permits a single Bluetooth™ link to serve multiple client browser applications, each requiring multiple network connections. Thus, for example, multiple applications running on the wireless headset device, which might otherwise require multiple sockets or connections, can share a single Bluetooth™ connection. This also permits applications already developed for the wireless headset to run, unaltered, on the device.

The Bluetooth™ proxy layer is added between the Bluetooth™ physical network and a network protocol, e.g., Transmission Control Protocol (TCP), layer. The Bluetooth™ proxy layer intercepts and funnels communication requests onto a single Bluetooth™ socket.

In other aspects, a virtual network client connection like VNC, RDP or SideShow may run on the wireless headset device, and a virtual network server can run on one or more host devices. The client and server can be paired by coordinating the client address assignment with the Bluetooth™ device discovery process. A special local host port proxy can be set on the wireless headset device to always look for requests appearing on a special port for automatic assignment of TCP level addresses.

In still further aspects, device drivers may be provided for different types of host devices. These host device drivers may then use a page mark up language to reformat the content they provide to a generic format that can be interpreted by the wireless headset client device. This permits a given type of content, for example, such as email inbox content, to always be presented to the wireless headset device in an expected format regardless of the exact type of host device from which the content originates. So, for example, email inbox content originating from a Blackberry™ device will be presented to the device browser application in this same format as email inbox content originating from a Microsoft® Windows based machine.

A system and corresponding method for displaying multimedia content received in a wireless manner comprises a host computing device configured to receive, format and transmit multimedia content, the host computing device having a utility, such as Microsoft SideShow, supporting a remote screen configured to operate while the host computing device is on, off, or in a sleep mode, and a mobile computing device configured to access the utility of the host computing device to receive and display the multimedia content.

The utility may provide remote access to storage, contents, applications and services of the host computing device, and may operate remotely without requiring user interaction with the host computing device through protocols, such as Remote Desktop Protocol (RDP) and Virtual Network Computing (VNC), and commercial services, such as GoToMyPC. Further, the utility may be modified by a user to repeatedly poll the host computing device at intervals for updated multimedia content and return the host computing device to the sleep mode. Multimedia content may be received over Bluetooth, 802.11(b), 802.11(g), 802.11(n), wireless USB, cellular, or Internet and may include audio, video, text, images, cellular service, WiFi, satellite service, broadcast television, closed circuit communications, or Internet access.

The mobile computing device may include a support structure, a display, and a positioning structure connected at a proximal end to the support structure and at a distal end to the display. Moreover, the mobile computing device may further be configured to transmit a request for multimedia content and the host computing device is further configured to receive the request for multimedia content from the mobile computing device. Similarly, the host computing device may be configured to retrieve multimedia content from remote databases.

In some instances a direct connection to another Bluetooth device may be used to stream video and audio data at high speed. The stream may contain file extensions that could allow automatic playing of content.

The portable wearable display platform may accept user input and control from sources consisting of digital inputs, voice, Bluetooth keyboard and mouse. These sources of input will allow the user flexibility to navigate and modify content such as menuing, browsing, virtual connections and office products like e-mail, presentations and the like.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 8-10 are block diagrams illustrating a Bluetooth proxy for carrying data packets over a bidirectional communication path.

DETAILED DESCRIPTION OF THE INVENTION

A description of example embodiments of the invention follows.

Figure 1:
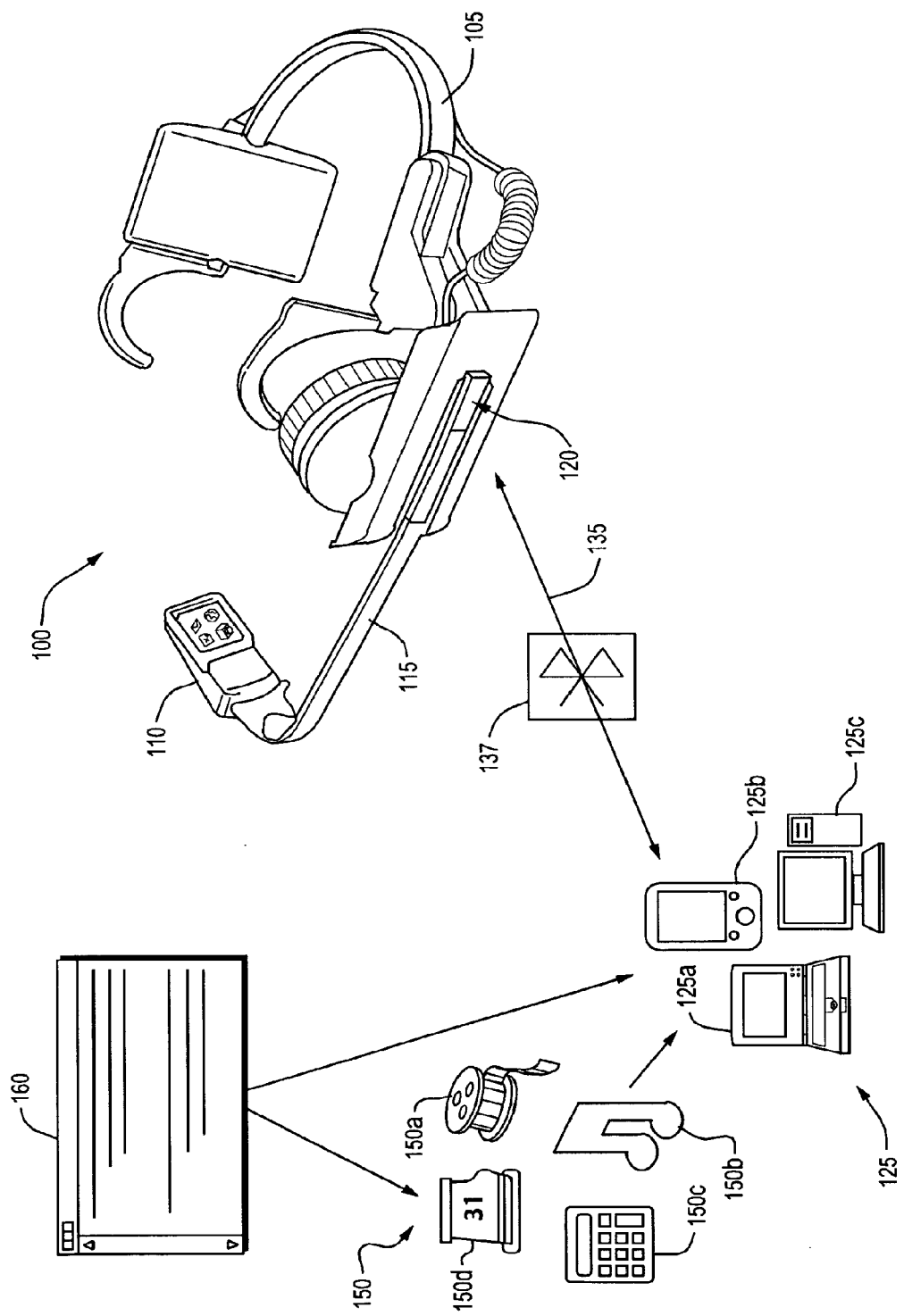
FIG. 1 is a diagram illustrating a perspective view of an example embodiment monocular display device according to the present invention, and wireless communications between the example embodiment monocular display device and host computing devices.

FIG. 1 illustrates an example embodiment monocular display device 100 according to the present invention that plays back multimedia content, and that can run business applications in a wireless manner from a remote computing device in a master-slave networked relationship. The present monocular display device 100 is a lightweight mobile device that includes a body portion 105 that is connected to a display element 110 by a telescoping arm 115, the body portion 105 housing one or more internal components of the device 100, including components of a hardware interface 120 and Bluetooth™ wireless hardware (not shows).

In one embodiment, the display element 110 is a Wide Video Graphics Array (WVGA) display sold under the trade name "CYBERDISPLAY® WVGA LV" manufactured by the instant Assignee. The display element 110 can be a color filter, wide format, active matrix liquid crystal display having a resolution of 854×480. The display element 110, in this embodiment, can be 0.58 inches in the diagonal dimension. In another embodiment, the display element 110 may alternatively include a Super Video Graphics Array (SVGA) display sold under the trade name "CYBERDISPLAY® SVGA LVS", which is also manufactured by the instant Assignee. The display element 110 can be a color filter, active matrix liquid crystal display having a resolution of 800×600. The display element 110 in this embodiment can be about 0.44 inches in the diagonal dimension and lightweight. Other display elements 110 are contemplated, such as those described in detail in U.S. patent application Ser. No. 12/008,114, filed Jan. 8, 2008, and U.S. patent application Ser. No. 12/007,104, filed Jan. 8, 2008, which are incorporated herein by reference in their entirety. The present device 100 is not limited by any specific display element 110, and can be used with any lightweight display known in the art configured for mobile operation.

Preferably, the telescoping arm 115 is a resilient bar-like member made from two cylindrically shaped, telescoping sections connected to a pivot, which are adjustable, and a user may extend and pivot the display element 110 to a comfortable viewing position relative to the body portion 105 so the display element 110 is not directly in front of the user, or blocking the user's vision, but instead is located in the user's peripheral vision. Preferably, the body portion 105 is a resilient member and may include a hook, or similar connector and be connected to a wearer's eyeglasses, or supported on the wearer. The display element 115 preferably is configured to remain outside the viewer's normal vision, and does not block the viewer's eyes, and instead is located outside the viewer's peripheral vision. In this aspect, the user may wear the monocular display device 100 in the user's day-to-day activities, such as, for example, during running, walking, or engaging in recreational activities in a comfortable manner. In one embodiment, the body portion 105 may include a separate clip, or separate connector to fasten to a user's eyeglasses, garment, hat, cap, or another support surface to correctly support the display element 115 located outside the viewer's peripheral vision.

The example embodiment monocular display device 100, preferably, can establish a two-way, or bidirectional wireless communication link 135 with a computing device 125 and thereafter the device 100 can send and receive data from and to the host device 125 across the wireless link 135 with a high data transfer rate. Thereafter, the monocular device 100 can convert the received data across the wireless link to multimedia including graphical video data to display images on the monocular display element 110, which may originate from the host computing device 125 or alternatively from another remove database or source, such as a remote memory.

In one embodiment, the wireless communication link 135 uses short range or long range radiofrequency signals over a designated channel to communicate data between devices in a protocol that is known by both devices 125, 100. Preferably, the radiofrequency signals are low power and in a range of about 1.0 mWatt to 100 mWatts. so as to transmit the radiofrequency signals across a desired distance, which can be from several feet or greater than twenty feet in length.

In one embodiment, the monocular display device 100 uses a Bluetooth® 137 communication standard to communicate with the host computing device 125. In one embodiment, the Bluetooth® technology permits data communication at a data transfer rate of around 1 Mbps with another computing device about 10 meters away using a 2.4 Gigahertz frequency.

In another embodiment, the wireless communication link 135 may use Institute of Electrical and Electronics Engineers (IEEE) 802.11(b), or IEEE 802.11(g), or another standard. In yet another embodiment, the wireless communication link 135 may include Bluetooth® 3.0 with a data transfer rate of about 480 Mbps, Ultra-Wide Band (UWB), Wireless Universal Serial Bus (WUSB), Wireless High Definition (WirelessHD), Wireless High Definition Multimedia Interface (WHDMI), WiFi, or any other high speed digital communication standard known in the art. In a further alternative embodiment, the monocular display device 100 may communicate with the host computing system 125 using a wired connection, instead of link 135 such as, for example, a serial port, or a Universal Serial Bus (USB) cable, or other wired connections. Alternatively, the wireless communication link 135 may include a Code Division Multiple Access (CDMA) standard, a Time Division Multiple Access (TDMA) standard, or Frequency Division Multiple Access (FDMA) standard or, alternatively, any other frequency hopping standard in spread spectrum communication known in the art to communicate data. Various protocol standards for wired and wireless communication are known in the art, and the present device 100 is not limited to any specific link, or radio frequency protocol.

The present monocular display device 100 uses the two-way, or bidirectional wireless communication link 135 with the computing device 125 to playback video and audio on the monocular display element 115. The monocular display device 100 also controls the host computing device 125, such as, for example, a wireless laptop 125a, to run business applications, retrieve e-mail, and run executable code, and applications from the laptop 125a across the wireless link 135. In this regard, the monocular display device 100 may include an input device 120 (e.g., input device 335 of FIG. 3) that can transmit a wireless input signal to the host computing device 125. The input signal can control the host computing device 125 to provide control signals to run applications on the host computing device 125. Thereafter, the host computing device 125 outputs a graphical output to the display element 110 for a remote display of applications operating at the host computing device 125 at the monocular display 100, which may be located a distance away from the host computing device 125. Hosts 125 source content 150 of various types for viewing on the display 110, including video 150a, audio 150b, computer data 150c, and other types of information, such as calendar 150d, email and any number of types of data that would regularly be found from hosts 125.

Further, a software System Development Kit (SDK) 160 may be used by an application programmer to specify interfaces for hosts 125, thereby permitting content 150 to be displayed on display 110. For a number of reasons, the device 100 may not be able to simply display existing web and other types of content. In particular, the content 150 needs to be specially designed and implemented to fit the display 110. To encourage this, the developer SDK 160 enables developers to quickly and easily develop the graphical portion of their applications. The backend of these same applications is then coded into a programmers language of choice for the particular device 100, as will be described in more detail below.

Using the two directional wireless communication link 135, the mobile device 100 can access Microsoft Windows SideShow® to provide data across the link 135 for access to the mobile device 100. Preferably, the Microsoft Windows SideShow® program may be accessed by the mobile device by a wireless Bluetooth, 802.11(b), 802.11 (c), or 802.11 (g) connection, and the mobile device 100 can be located far in distance from the host computing device 125. Preferably, the mobile device 100 can be wirelessly connected to the host computing device 125 via the Internet. Therefore the mobile device 100 is able to connect from anywhere in the world and may access data from a memory operatively connected to the remote host computing device 125.

Further, a PC user can use Microsoft Windows SideShow® to remotely drive, access and command the contents, applications and PC services of a PC or server without having to touch the hibernating or woken PC through Remote Desktop Protocol (RDP), Virtual Network Computing (VNC), GoToMyPC (a commercial remote access PC command and control service), etc.

It should be appreciated that the monocular display device 100 is not limited to using any specific host computing device 125, and it should be appreciated that the discussion with regard to the laptop computer 125 is merely illustrative, and is not limiting. The present monocular display device 100 may instead communicate with other mobile portable device or informational databases, such as, for example, a cell phone, Personal Digital Assistant (PDA), such as a PALM® compatible device, desktop computer, tablet computer, mobile e-mail communication device, such as, for example, a Blackberry® device or a Good Technology® compatible device, or personal digital music or video player, such as, for example, an Apple I-Pod® video and audio player, Microsoft Zune® multimedia players, and other Motion Picture Experts Group (MPEG)-1 Audio Layer 3 (MP3) music players, digital video players, or drives. The host computing devices 125 also can include automotive systems, Global Position System devices, Satellite Radio receivers or players, such as, for example, XM Satellite Radio®, or Sirius Satellite Radio® compatible devices. The host computing devices 125 can also include mainframe computing devices, digital testing devices, diagnostic equipment, a TIVO® or other digital video recorder, a set top cable box, or any other digital or analog device known in the art.

It should be appreciated that the monocular display device 100 should have suitable program instructions to convert from a first format to a second format that the desired host computing device 125 can receive and operate with to correctly send control signals, and in this regard, the monocular display device 100 preferably includes a converter (not shown) that converts between formats depending on the specific host computing device. Various format configurations are possible and within the scope of the present disclosure, and the present auxiliary monocular display 100 is not limited to any specific host, or communication format.

The host computing system 125 may communicate with remote databases, and may act as an intermediary between the monocular display device 100 and a source of multimedia content, or site, so the user can view multimedia (in the peripheral vision of the wearer) without the associated heavy computing device and network connections associated with obtaining the multimedia content. It is envisioned that the device 100 is very lightweight, in the order of a few ounces, and supported by the wearer so the wearer can move in an obstructed manner to engage in normal day-to-day activities.

The host computing device 125 may be a personal computing device, such as, for example, a desktop or laptop computer that includes an operating system (OS), such as, for example, the Microsoft Windows Vista® OS, Microsoft Windows Mobile®, Apple Mac OSX® OS, Symbian OS compatible operating systems, Lenovo compatible operating systems, the Linux operating system, the UNIX operating system or another known suitable operating system that is Internet ready, and configured for wireless mobile operation.

Figure 2:
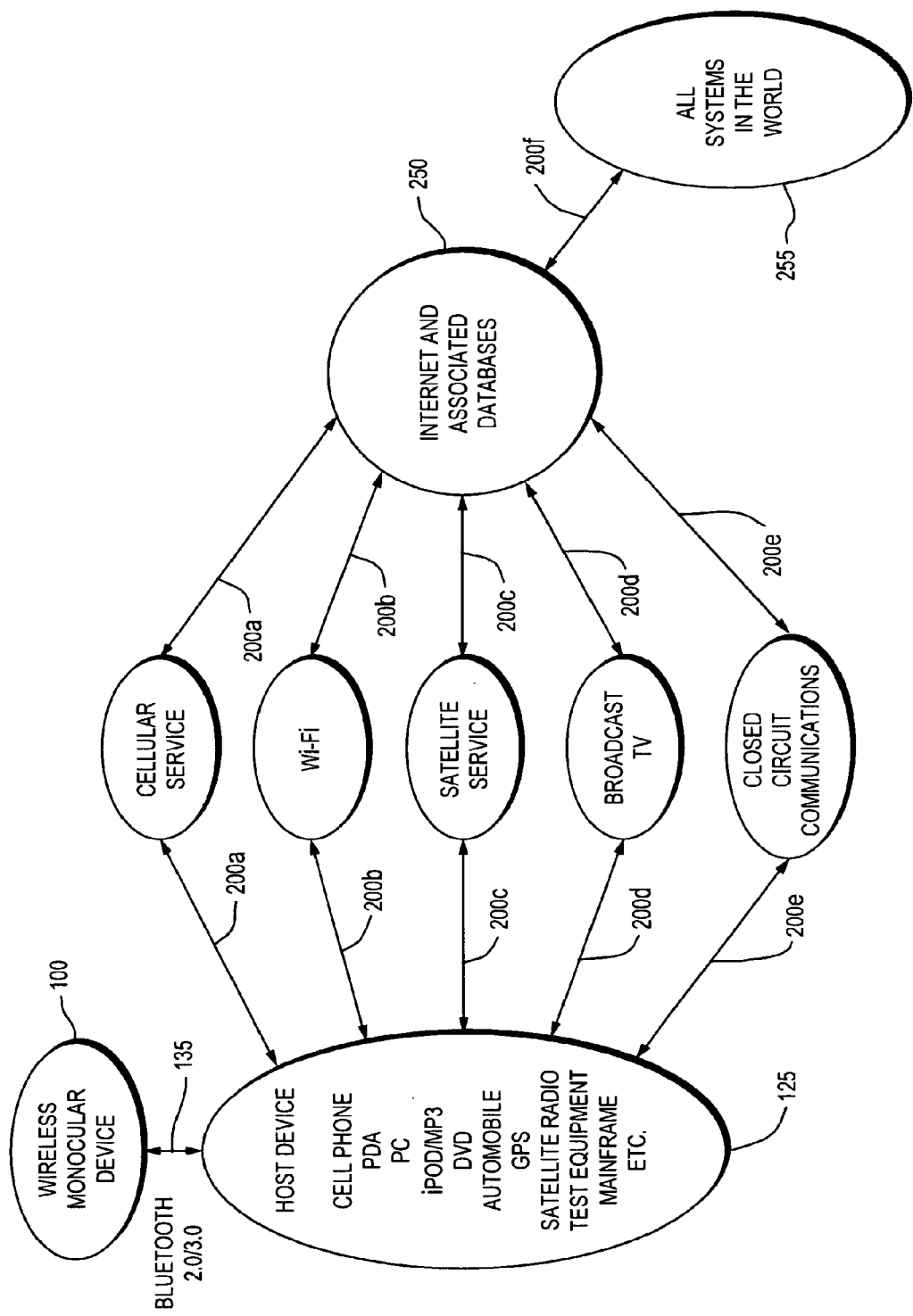
FIG. 2 is a network diagram illustrating communications between an example embodiment monocular display device and host computing devices, and communications between the host computing devices and other external databases and the Internet for delivery of multimedia content to the monocular display device.

FIG. 2 is a diagram illustrating an example embodiment monocular display device 100 interacting with a host computing system 125. The host 125 obtains information along a bi-directional communication path(s) such as cellular service 200*a*, Wi-Fi 200*b*, satellite service 200*c*, broadcast television 200*d*, and closed circuit communications 200*e* to the Internet 250 or associated databases 255 for which to display content on the display element 115 of the monocular display device 100.

In one embodiment, the communication path 200*a* may be a cellular mobile communication wireless path, and each path may be different or the same relative to the remaining bidirectional communication paths 200*b* through 200*e*. In one embodiment, the host computer 125 may obtain information using Sprint® EV-DO Wireless Broadband Connection, and then communicate with the monocular device 100 using a Bluetooth® wireless connection 135.

In another embodiment, the communication path 200*b* may be a Wi-Fi communication path, or similar radiofrequency signal communication link. The host system 125 may communicate with satellite services providers, digital video recorders, broadcast television providers, or closed circuit communication devices using paths 200*c*, 200*d*, or 200*e*, respectively. Paths 200*a* through 200*e* may also be associated with a public access wireless hot spot.

It is appreciated that the present monocular display device 100 may be compatible with NASCAR Nextel Fan View™ to watch closed circuit television of sporting events, and/or kangaroo.tv broadcast devices for displaying closed circuit television events. The present monocular display device 100 may be configured to receive live broadcasts, can receive multiple different broadcast views of sporting events in real time (of the same or different events), statistical information, and audio data.

The host system 125 may access a World Wide Web server on the Internet 300 along paths 200*a*, 200*b*, and obtain information, which is held and displayed to the display element 115 along communication link 135. In one embodiment, the data can be in a known data format such as, for example, Hyper Text Markup Language (HTML), Extensible Markup Language (XML), Joint Photographic Experts Group (JPEG), Waveform (WAV), Audio Interchange File Format (AIFF), Bitmap (BMP), Picture (PICT), Graphic Interchange Format (GIF), and Windows Media Video (WMV), or any other data format suitable for multimedia content including streaming video, and audio. The data can be obtained from the Internet from databases 305 along path 200*f*. Various communication path configurations are possible and within the scope of the present disclosure.

The host computer 125 can send and receive data along a wireless communication path 200*b* to the Internet and other system web pages or information databases 300 using HTML along bidirectional communication path 200*b*. The host system 125 may include Internet browsing software (such as know web browsers including, Microsoft Internet Explorer®, Opera®, Netscape Navigator®, and Mozilla Firefox®) to send and receive data along paths 200*a* and 200*b*. It should be appreciated that the host system 125 may be connected to the Internet by a cellular telephone network, and/or an Internet Service Provider Gateway Server.

Moreover, the present monocular display device 100 may be configured to receive push e-mail, pull e-mail or periodically forwarded e-mail from e-mail accounts, such as, for example MSN® Hotmail, Google® G-Mail, Yahoo!® mail, AOL® Mail, or any other e-mail provider or Internet site known in the art along path(s) 200*a* through 200*e*. In one embodiment, the wireless link 135, or communication paths 200*a* through 200*e*, may be compatible for use with a Staccato Communication® Ultra Wide Band (UWB) USB that includes a radiofrequency (RF) transceiver, a digital baseband, and an interface to provide for wireless connectivity up to 480 Mbps on a single chip footprint, which can be located in the monocular display device 100, or in the host computing device 125.

It should be appreciated that, in one embodiment, the host computing device 125 and the monocular display device 100 form a master/slave relationship with one another. The host computing device 125 can include a Microsoft Windows® OS that recognizes the monocular display device 100 as a secondary auxiliary display relative to the primary host computing device 125, and primary display. The host 125 may use the operating system to control the secondary monocular display device 100 in a wireless manner.

It should be appreciated that the monocular display device 100 may wirelessly interface with two or more host devices 125, such as a first computing device, and a second computing device, in a substantially simultaneous manner over at least two independent wireless communication paths 135. In this aspect, the monocular display device 100 may synchronize with the first computing device, the second computing device, and other devices so that the monocular display device 100 acts as a central hub.

In this aspect, the monocular display device 100 may initiate a first wireless communication path with the first device and also simultaneously initiate a second wireless communication path with the second device. The first and the second communication paths may be the same or different, and may configured over a Bluetooth® connection, or a modified Bluetooth® connection, or another protocol. In one aspect, the communication path may be a Bluetooth® 2.0 or 3.0 connection, an IEEE 802.11 or IEEE 802.15 wireless communication protocol, and the connection may be suitable to communicate over a number of channels simultaneously with a variable bit rate, and a variable buffer. In an alternative embodiment, the communication path may be a Bluetooth® connection, and the connection may be suitable to communicate over all channels simultaneously with a variable bit rate, and a variable buffer.

The first computing device, and the second computing device can be any of the previously mentioned computing devices, such as a laptop, a server, the Internet, a desktop, a Smartphone, a mobile phone, a music player, or any other mobile or non-mobile device, and various computing devices are possible and within the scope of the present disclosure. Preferably, using the monocular display device 100, the viewer may control the device 100 to remotely interrogate a first computing device over a wireless Bluetooth® connection to pair with the first computing device. Thereafter, the device 100 may output control program instructions to the first computing device to perform functions at the device 100. In one aspect, the communication path may be a Bluetooth® connection, and the connection may be suitable to communicate over a number of channels simultaneously with a variable bit rate, and a variable buffer. The path can be suitable to communicate video, audio, graphics, or any data.

Thereafter, the device 100 (while communicating with the first computing device) can also interrogate a second computing device over a wireless Bluetooth® connection to pair with the second computing device. This may be accomplished using a different or the same wireless interface. Thereafter, the device 100 may output control program instructions to the second computing device. In one aspect, the communication path may be a Bluetooth® connection, and the connection may be suitable to communicate over a number of channels simultaneously with a variable bit rate, and a variable buffer. The path can be suitable to communicate video, audio, graphics, or any data.

Various computer communication configurations are possible and within the scope of the present disclosure, and device 100 may be configured to control any number of other computing devices, and/or peripheral devices, such as, for example, a wireless headset, a wireless memory, wireless speakers, etc. For example, the device 100 can independently pair with two cell phones simultaneously. In this manner, the wearer may make independent calls using the two cell phones using program instructions transmitted from monocular display device 100.

Alternatively, the device 100 can pair with a cell phone and a laptop computer having a wireless modem to make a call using the cell phone using the device 100, while controlling the laptop computer to play video, which is transmitted over a Bluetooth connection to be displayed on device 100. Various configurations are possible and within the scope of the present disclosure, and it should be appreciated that the device 100 may control three or more devices, or more by establishing more than one wireless communication link.

Figure 3:
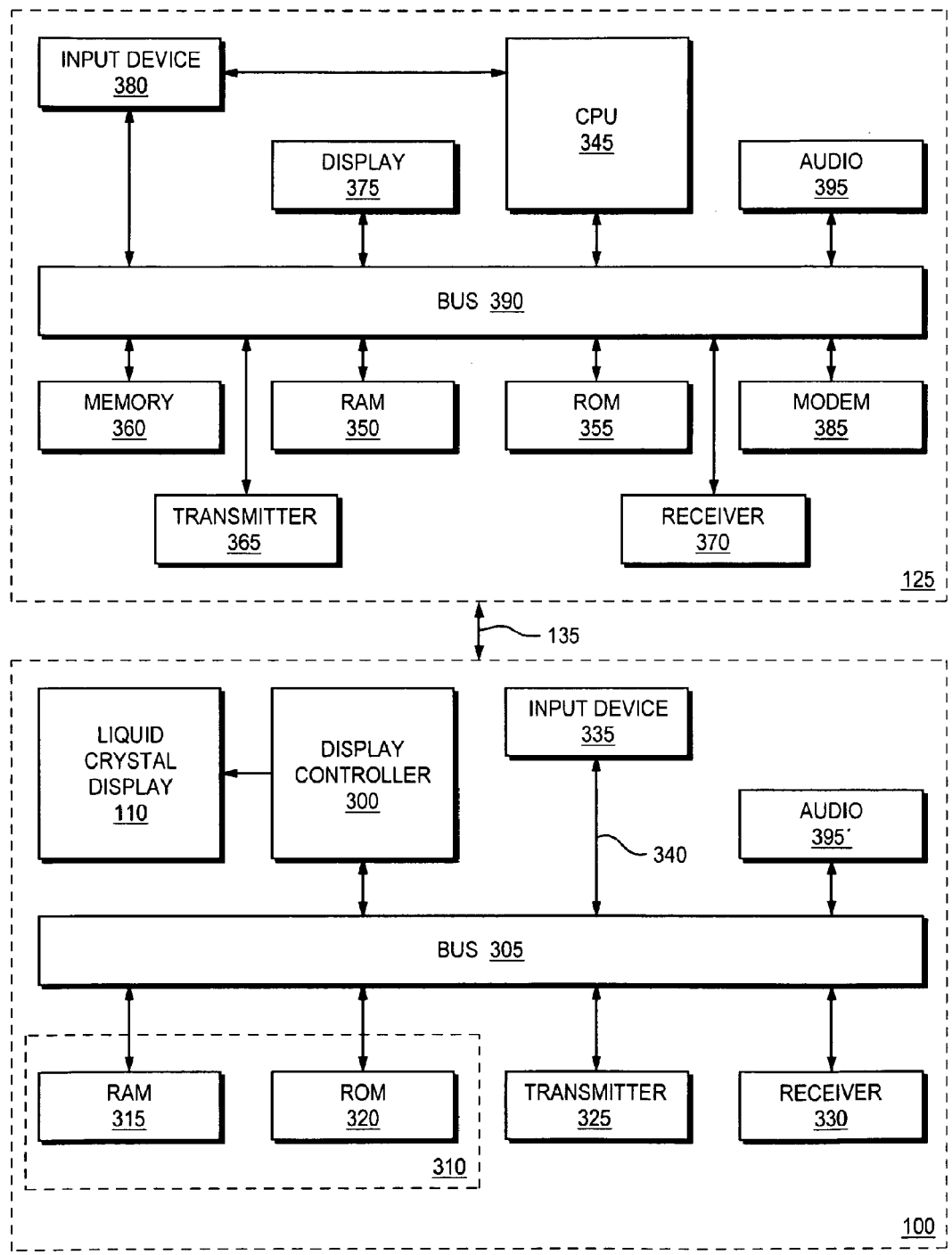
FIGS. 3-4 are block diagrams illustrating simplified schematic drawings of internal components of example embodiment monocular display devices and host computing devices adapted to wirelessly transmit data over a bidirectional communication path.

FIG. 3 illustrates a simplified block diagram of a non-limiting example embodiment of the present monocular device 100, for illustration purposes. The monocular display device 100 includes a display element 110 connected to a display controller 300, which may be a digital signal processor made by Intel®, Freescale Semiconductor®, or Advanced Micro-Devices (AMD)®, or another controller connected to a bus 305, such as a Peripheral Component Interconnect (PCI) bus. In one embodiment, the display 110 may be connected to a video graphics card (not shown) which is connected to the bus 305. The video graphics card can be an Accelerated Graphics Port (AGP) video card that fits to an AGP video card slot in the device 100. The monocular device 100 also includes memory 310, such as a random access memory (RAM) 315 and a read only memory (ROM) 320 which saves executable program instructions, and communicates the program instructions to the controller 300 through bus 305. Preferably, the monocular device 100 further includes a transmitter 325 and a receiver 330, and/or a combined transceiver (not shown), both of which are connected to the bus 305 to form a wireless interface with the host computing device 125. The transmitter 325 and receiver 330 also are connected to the display controller 300 and receive instructions for control thereof.

The monocular display device 100 also includes an input device 335 which can be a wireless mouse, trackball, or keyboard, or other similar wireless device that may be wirelessly connected to the PCI bus 305 by a wireless link 340, which is received by the receiver 330. Alternatively, the input device 335 may be connected in a wired manner (not shown) to the bus 305 to provide an input signal to the controller 300. The input device 335 may control screen prompts on the monocular display device 100, the host device 125, or both the monocular display device 100 and the host computing device 125 with the monocular device 100 and the host 125 in a master/slave networked relationship.

The monocular device 100 interrogates an external or host device 125 and is configured to establish a wireless link 135 with the host device 125 such that the host device 125 can provide uplink and downlink data to the monocular device 100 in a bidirectional manner across the wireless link 135. In one embodiment, the monocular device 100 can receive uplink data that is suitable to display graphical multimedia information on the display 110 of the monocular device 100.

The host computing device 125 includes a central processing unit 345, a memory having a RAM 350, a ROM 355, and also including a cached memory 360. The computing device 125 further includes a transmitter 365 and receiver 370, and/ or a combined transceiver (not shown). The host device 125 may also include a primary display 375 and an input device 380 which are both connected to a bus 390, such as a PCI bus, as shown. It should be appreciated that the bus 390 may be connected to a wired broadband connection (not shown), or a wireless broadband connection 385, a DSL line, a cable modem, a media player, a music or video player, or any other suitable link to receive data from a database.

During an initial stage of operation, a bi-directional wireless link 135 is established between the transmitter of the monocular display device 325 and the receiver of the host device 370 and an authentication process occurs across the wireless communication path 135. Thereafter, the monocular device 100 can wirelessly communicate with the host receiver 370 over a wireless communication link 135, and the host transmitter 365 can transmit signals to the monocular device receiver 330. In one embodiment, the monocular display device 100, from its transmitter 325, may wirelessly communicate with the host receiver 370 using a Bluetooth® 2.0 or 3.0 wireless radiofrequency standard. In another embodiment, the monocular device 100 may wirelessly communicate using a wireless Ultra Wide Band communication link 135, or using short-range radio frequency signals 135.

In one non-limiting embodiment, the central processing device 345 associated with the host computing system 125 executes program instructions and uses Microsoft Windows SideShow® to interrogate the monocular display device 100 to allow the monocular display device 100 transmitter 325 and receiver 330 to access the cached memory 360 of the host computing device 125. The contents of the cached memory 360 is then communicated to the bus 390 and to the transmitter 365. Controller 345 outputs a control signal to transmit data from the transmitter 365 to the monocular display device 100, and to display multimedia on the monocular display 115 when the host computing device 125 is off, or without power. Upon receipt by the receiver 330, the receiver 330 communicates with bus 305 to transmit the received data to display controller 300.

Display controller 300 outputs control signals to the display 110 to display images. This allows the monocular display device 100 to receive data stored on the cache memory 360 of the host computing device 125. When the host computer 125 is not in use, or switched off, the data viewed on the monocular display device 100 is from the cached memory 360, and not updated. This data may be slightly older and not refreshed through the communication links 200a through 200e, as compared with when the host computing device 125 is operational. It should be appreciated that the monocular display device 100 and the host computing device 125 also include audio devices 395, 395' that receive a control signal and play audio in response thereto.

Microsoft Windows SideShow® is configured to recognize multiple other secondary displays 100 separate, or remote from, the host computing device 125. The display element 110 of the monocular display device 100 can be used to view multimedia, run executable code, run applications, view email, view calendar applications, and other host computing data, which is transmitted over the wireless link 135 to the monocular display device 100, even if the host computing device 125 is off, or without power.

Alternatively, the monocular display device 100 may be configured to be used as a secondary display together and at the same time with the host computer 125 in a networked arrangement. Thus, using the input device 335 of the monocular display device 100 and the display element 115, the user may access data on the host computer memory 360 and run applications using the processor 345 of the host computer 125 all from the secondary display element 110 of the monocular display device 100 in a master/slave relationship, which can display a different display relative to the primary display of the host computer 125.

Figure 4:
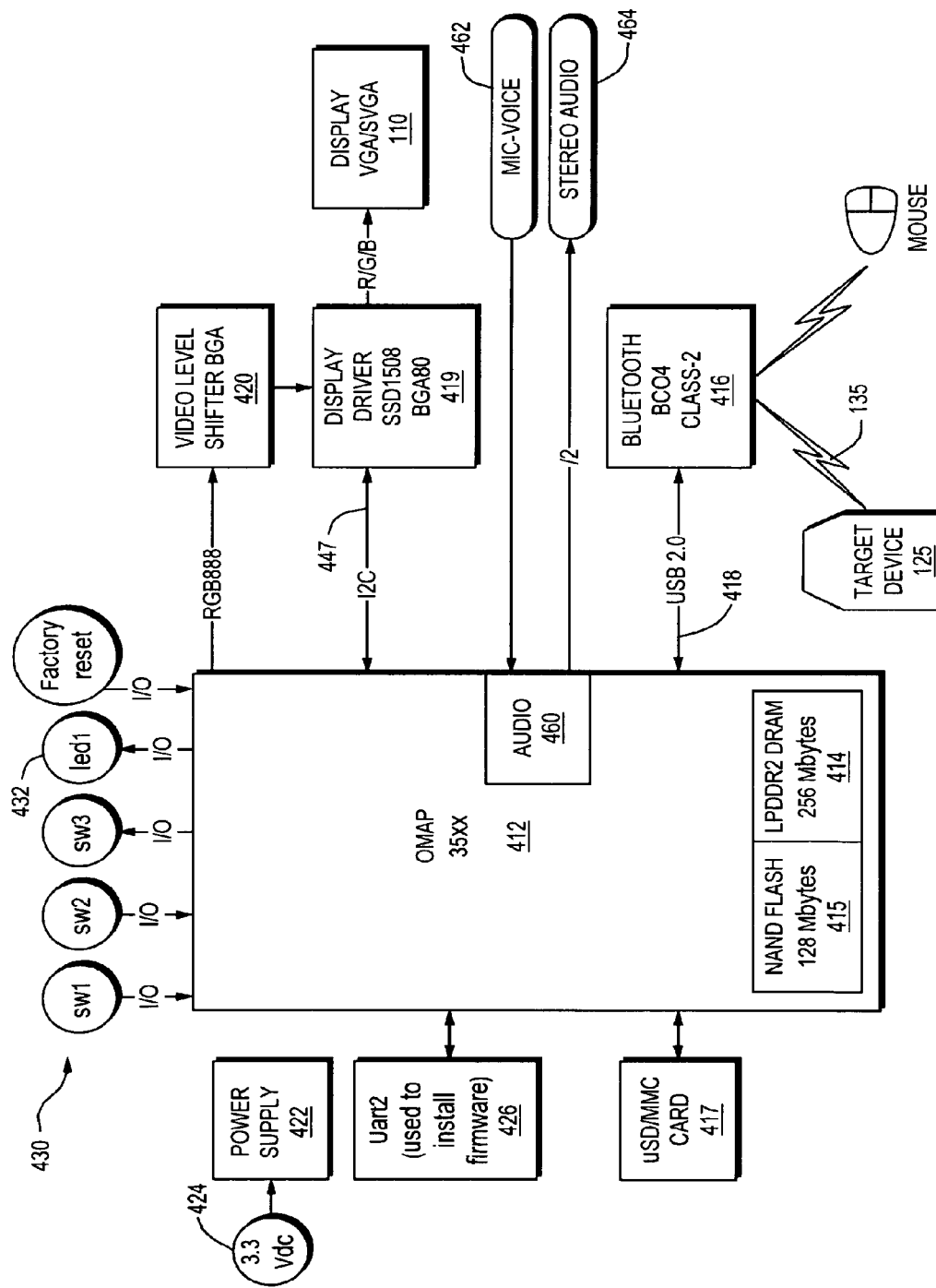

FIG. 4 provides a more detailed view of the electronic components incorporated into the wireless headset display device 100, which is connected to host system(s) 125 to receive a digital video signal over a Bluetooth connection. These components are described in greater detail in a copending patent application 61/010,177 filed Jan. 4, 2008, entitled "PROTOCOL FOR TRANSPORTING VIDEO SIGNAL OVER BLUETOOTH WIRELESS INTERFACE", which is incorporated herein by reference in its entirety.

In the preferred embodiment, the headset 100 includes an Advanced Reduced instruction set computer (RISC) Machine (ARM)/Digital Signal Processor (DSP) 412 (which may be an Open Multimedia Application Platform (OMAP) 3500 series processor, available from Texas Instruments of Dallas, Tex.), memory 414, Bluetooth interface 416 which may be provided by a Class 2 Bluetooth interface available from Cambridge Silicon Radio (CSR) of Cambridge, England), display driver 419 (which may, for example, be an SSD1508 display driver available from Kopin Corporation of Westborough, Mass.), video level shifter circuits 420, a power supply 422 supported by a batter 424, universal receiver transmitters (UART) 426 (such as may be used for debugging) and memory 415. A Secure Digital (SD), eXteme Digital (xD), USB SD (uSD) memory 417 or other similar interfaces may be used to store application programs, kernel directives, or configuration data, and/or connect to devices such as a digital camera. A number of buttons 430 may be associated with the device (e.g., switch 1/switch 2/switch 3 and reset inputs) and an LED output 432 (led 1). A VGA or better quality display 110 and audio input and output device(s) 460, which may include microphone input 462 and stereo outputs 464, are also provided.

The signal may be sent over the Bluetooth wireless connection established using Serial Port Profile (SPP) from the device 100 to the host 125, as opposed to using any of the "advanced" Bluetooth modes, which provides greater throughput higher than the higher layer protocols imposed by such advanced modes that have been found not to be needed in this application. In the Bluetooth Radio 416, the video signal received over the Bluetooth connection is sent over the USB connection 418 from the interface 416 to the ARM/DSP 412.

One design consideration is to optimize data packet format, given known data buffer sizes. Internal to the CSR chip 416 is a packet buffer default size of 1000 bytes. This may be modified to force streaming video signals to use only about a 990 byte buffer size.

The processor 412 may expect the received video content to be encoded with the H.264 (Motion Picture Experts Group (MPEG)-4 part 10) formatting, using the so-called baseline profile or better.

In a preferred embodiment, the ARM/DSP processor 412 may use a multi-tasking embedded operating system. The processor 412 operates on the received video signal as follows. An MPEG format container file (e.g., a .MP4 file) is made available. In one preferred embodiment, this can be a proprietary file format, although the specific details of the input .MP4 file format chosen are not important here, as long as the DSP 412 is programmed to correctly process it. The processor 412 then opens a communication port to the host system 125 and receives the file over the USB interface 418 from the Bluetooth transceiver in the CSR chip 416.

An MP4 decoder in the DSP 412 strips the file into respective audio and video streams. More particularly, the DSP 412 decodes the input file H.264 compressed digital video signal into a YCbCr baseband component video signal. The ARM/DSP 412 can also divide the associated compressed audio (formatted as an Advanced Audio Coding (AAC) format signal) into baseband stereo audio.

The ARM/DSP 412 can output video in any suitable format such as an 8 bit, International Telecommunication Union Radiocommunication Sector (ITU-R) Recommendation BT. 656 or Society of Motion Picture and Television Engineers (SMPTE) 293M 16 bit YUV progressive scan with separate sync signals, to the display driver 118.

The decompressed video signal can be forwarded over an internal ARM bus of the processor 416. The ARM bus then sends the content directly to the display driver 419 via the SMPTE 293M interface. The Intelligent Interface Controller (I2C) interface 447 is used to configure the display 110.

The ARM 412 also outputs the baseband audio to the audio output Compression/Decompression Module (CODEC) 460. It may take mono or stereo audio input and produce suitable stereo output signals.

Figure 5:
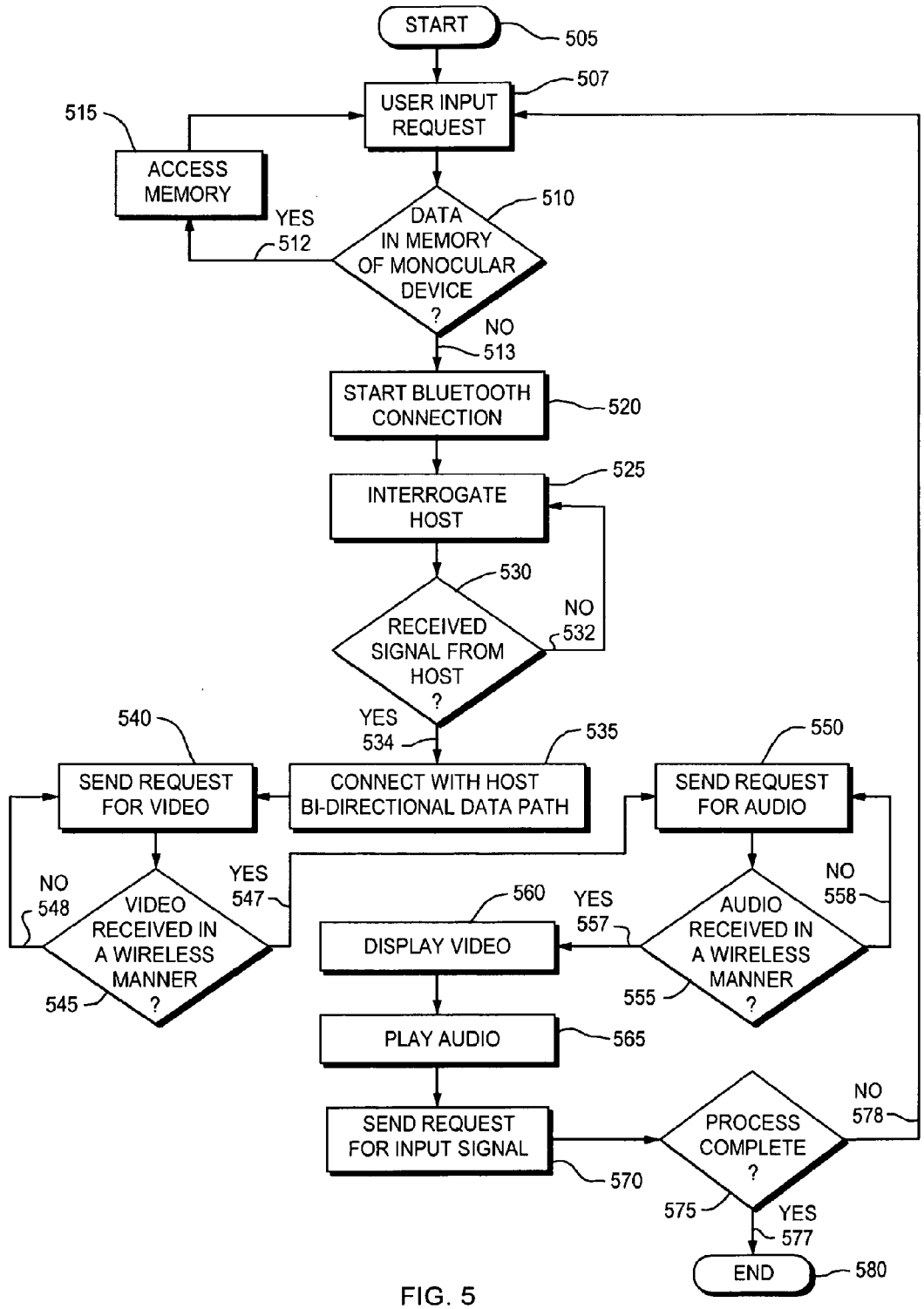
FIG. 5 is a flow chart illustrating operation of an example embodiment monocular display device.

FIG. 5 is a flow chart of a method 500 of operation according to an embodiment of the monocular display device. The method commences (505). Thereafter, the monocular display device awaits (507) a user input request. This input can be any signal output from an input device, such as, for example, an output from a wireless trackball, a wireless mouse, or a wireless key pad, or a button located on the housing of the monocular display device (e.g., housing 105 of FIG. 1). In one embodiment, using an operating system, such as, Microsoft Windows Mobile® operating system, and using a wireless mouse, the user may double click an icon on the monocular display device screen (e.g., screen 110 of FIG. 1) to indicate to open an electronic mail message, or to open an application. Thereafter, the method 500 attempts to receive data from a source of content, in response to the request, and the method will determine (510) whether the content source is located in a memory on the monocular display device (e.g., memory 310 of FIG. 3), such as, for example, on a camera output, or whether, the source is located at another remote location, such as, on the host computer (e.g., host 125 of FIG. 1). If the data is indeed stored locally (512) and no wireless link is needed, then the local memory is accessed (515) and the data is configured to be retrieved and loaded for subsequent display on the display element. Once the method 500 accesses the local memory (515), the method 500 returns to wait for a new user input request (507).

However, if the data is located on a remote memory or in a memory not located on the monocular display device (513) then a Bluetooth® connection, or other previously described wireless connection(s), is started (520) to obtain the data as requested (507). It should be appreciated that other wireless communication formats may also be used, as previously discussed, and the present method 500 is for illustration purposes only.

The device's transmitter (e.g., transmitter 325 of FIG. 3) may be activated to interrogate (525) the host computing device, and to send an initial configuration signal to the receiver (e.g., receiver 370 of FIG. 3) of the host computing device. The host determined whether the Bluetooth® signal is sufficiently powered and was received (530) from the monocular display device 100. Once the signal is received, the host transmitter (e.g., transmitter 365 of FIG. 3) will send a confirmation signal to the monocular device receiver (e.g., receiver 330 of FIG. 3) by using a second predetermined signal. If the signal was not received (532), then the monocular display device continues to interrogate the host (525). A stronger or more directive signal will be sent. If the signal is correctly received (534) by the host computing device then a bi-directional communication data path is formed (535) across the wireless link (e.g., wireless link 135 of FIG. 3). Uplink and downlink signals may be communicated across the bidirectional connection data path to and from the devices (e.g., monocular display device 100 and host 125 of FIG. 3), the present method being merely illustrative as various diagnostic, utility applications and signals that may be sent along the wireless link in addition to the nonlimiting method of FIG. 5.

Once the bi-directional communication data path is formed (535), multimedia data files may be communicated from the host computing device to the monocular display device. In one non-limiting embodiment, the bandwidth of the communication path is sufficient in bits per second that, when operating Microsoft Windows Vista® Operating System at the host computing system, the graphical output of the host display output screen (e.g., host display 375 of FIG. 3) is visible in real time at the display element (e.g., display 110 of FIG. 3), such that if both displays were held side by side, a cursor movement would occur on both screens substantially simultaneously to enable remote operation of the host computing system at the monocular display device.

The display controller (e.g., controller 300 of FIG. 3) sends (540) a request for a video signal from the computing device. The request is communicated to the bus 305, and to the transmitter and then sent across the link. Thereafter, the monocular display device determines (545) whether the video signal was received from the host computing system in a wireless manner. If the signal was wirelessly received (547), then the monocular display device requests audio (550). If the signal was not received in a wireless manner (548), then the monocular display device returns to send another request (540).

The display controller sends a request for an audio signal (550) from the host computing device. The audio and the video signal may be sent as one continuous signal and the present disclosure is not limited by any such two signal embodiment. The request is communicated to the bus (e.g., bus 305 of FIG. 3), to the transmitter, and then sent across the link.

The monocular display device then determines (555) whether the audio signal was received from the host computing system in a wireless manner. If the audio signal was wirelessly received (547), then the monocular display device displays video (560). If the audio data or signal was not received wirelessly (548), then the monocular display device returns to send another request (550).

The program instructions cause the monocular display device to display video (560) on the display by the display controller, preferably in the peripheral vision of the user, and play audio (565) using the audio device (e.g., audio device 395 of FIG. 3). Thereafter, a request for a further input signal is sent (570). It is then determined (575) whether the process is complete. If the process is complete (577), then the method ends (580). If the process is not complete (578), a further user input request is awaited (507). Various control configurations are possible and within the scope of the present disclosure, and the present configuration is for illustration purposes only, and it is envisioned that multiple other steps for encryption, and to decipher host computing or other external computing device formats are also envisioned.

Figure 6:
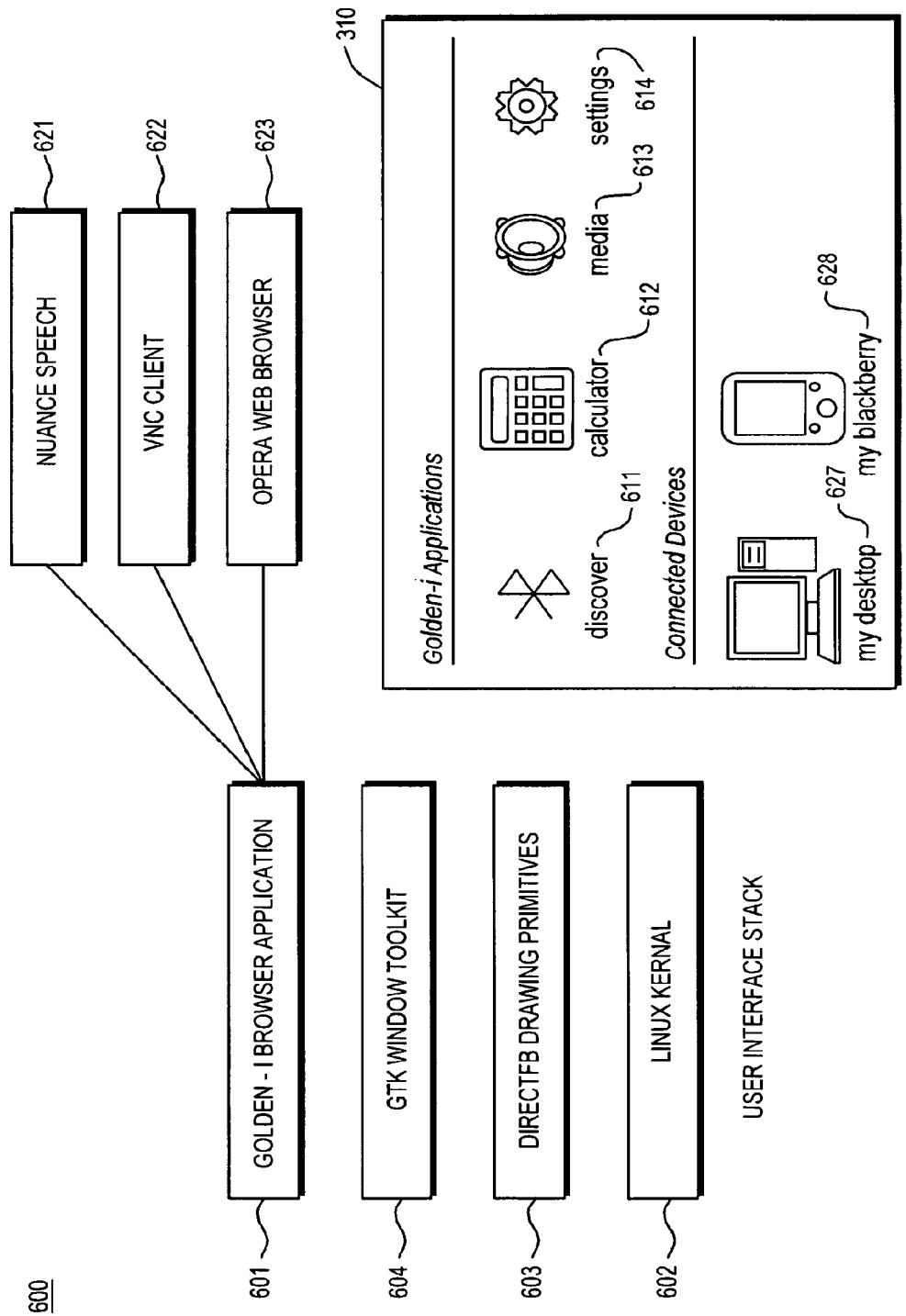
FIG. 6 is a high level software diagram indicating how the monocular display device can be used to control and manage various hosts through a user interface.

FIG. 6 is a high level software diagram indicating how the monocular display device 100 can be used to control and manage various hosts 125 through a user interface. A software stack 600 includes a device application browser 601 which may run on top of the kernel of an operating system (OS), such as a Linux kernel 602, drawing primitives, such as those provided by a Direct FB (DirectFB) stack 603, and a graphical tool kit, such as a Gimp Tool Kit (GTK) window tool kit 604. The device application browser 601 allows a user to access application software for wireless video headset 100 through an icon and menuing interface. This typically consists of custom code written for the particular device 100.

The OS 602 is ported to run on the processor in the wireless video headset 100, such as the OMAP 3500 series ARM/DSP shown in FIG. 4. The kernel level 602 otherwise provides standard operating system functions. The drawing primitives layer 603 may be a somewhat thin graphical library that provides for graphic acceleration input device handling and abstraction integrated windowing system. The end result is a graphical user display, such as that shown in item 310 which has various applications available to the user, such as Bluetooth™ discovery 611, a calculator 612, media player 613 and a settings interface 614.

Applications running within the context of the device application browser 601 may include a speech input 621, a Virtual (Desktop) Network client 622, and a web browser 623. Virtual Network is a system that allows a personal computer (PC) to be controlled remotely. It does this by exporting an entire screen display to another device in the form of a bitmap. This bitmap is wrapped in a network protocol and received by the device and simply displayed. Similarly, any mouse movements or keyboard entry data detected by the local device are passed directly to the remote PC to be acted upon.

The speech command interface 621 provides or allows for voice input commands to control the application browser 601. Thus, for example, a user may say the word "calculator"—where this is then detected by the speech device, the operating system 602 launches the calculator application. In general, text labels displayed next to on-screen buttons or icons within the context of the application browser indicate a spoken word which will activate the corresponding button.

Digital inputs (switches) can also be used to navigate and select menu functions allowing for full control and editing of applications and associated data.

Discovery application 611, as will be understood shortly, allows not only for discovery of neighboring Bluetooth™ devices but also connecting them through to the application browser level. For example, shown in the example user display 610 is the fact that there are presently two connected devices, including a desktop computer 627 and a Blackberry™ 628. The devices 627, 628 have been discovered through operation of the discover application 611. This may be, for example, initiated on first power up of the wireless headset device 100 or by a user manually initiating a Bluetooth™ discovery process. The Bluetooth™ device discovery proceeds as per the Bluetooth™ specification, reporting any new Bluetooth™ layer devices as they are connected at a physical layer.

At this point, however, additional functionality is provided to permit communication with the Bluetooth™ devices at a network level. In particular, a client 627, 628 is told to open a special port on a localhost: address that is local to the wireless headset device. This device port acts as a proxy, always looking for such requests. When a request is received, it reports back an available network level address (i.e., such as a TCP/IP address) to be used by an individual device 327, 328 for network level communication.

Figure 7:
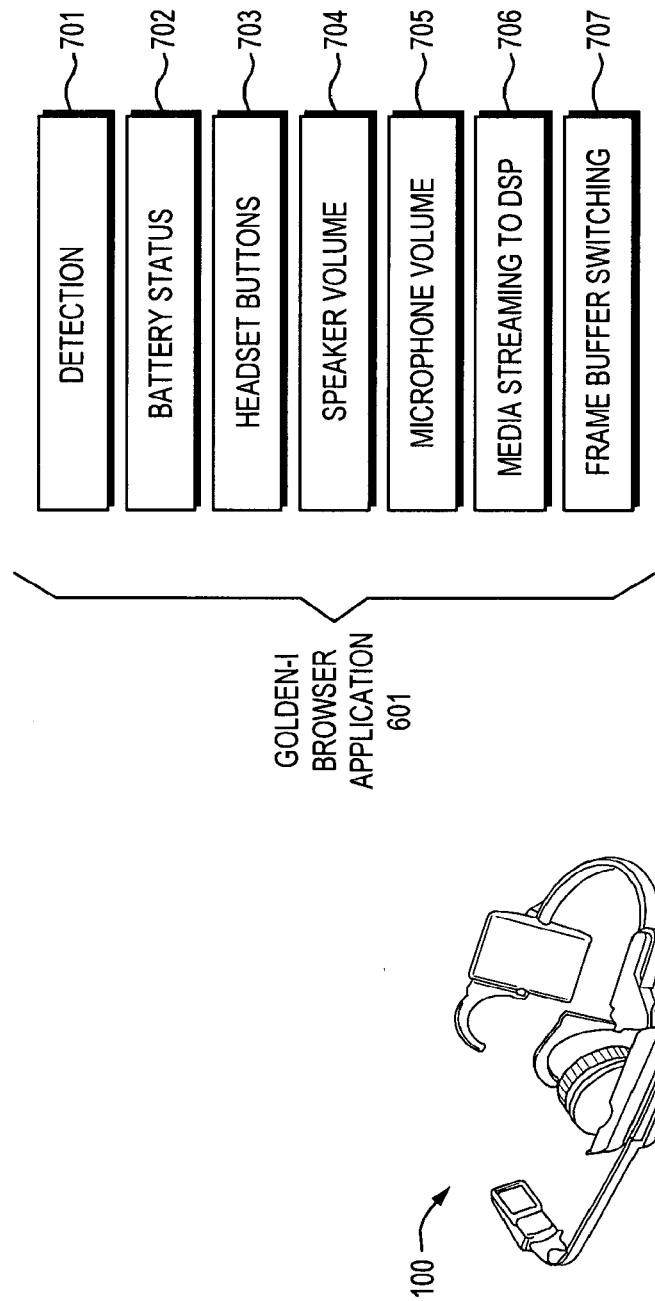
FIG. 7 is a diagram illustrating an example hardware interface of an example embodiment monocular display device.

FIG. 7 illustrates hardware interface functionality 700 also provided by the browser application 601 of FIG. 6 which may receive and/or control various hardware functions on the device 100. Such functions may include headset detection 701, battery status 702, output device adjustment, such as headset button 703, speaker volume 704, microphone volume 705, media streaming functions 706, frame buffer switching 707, device drivers, and like functions.

Figure 8:
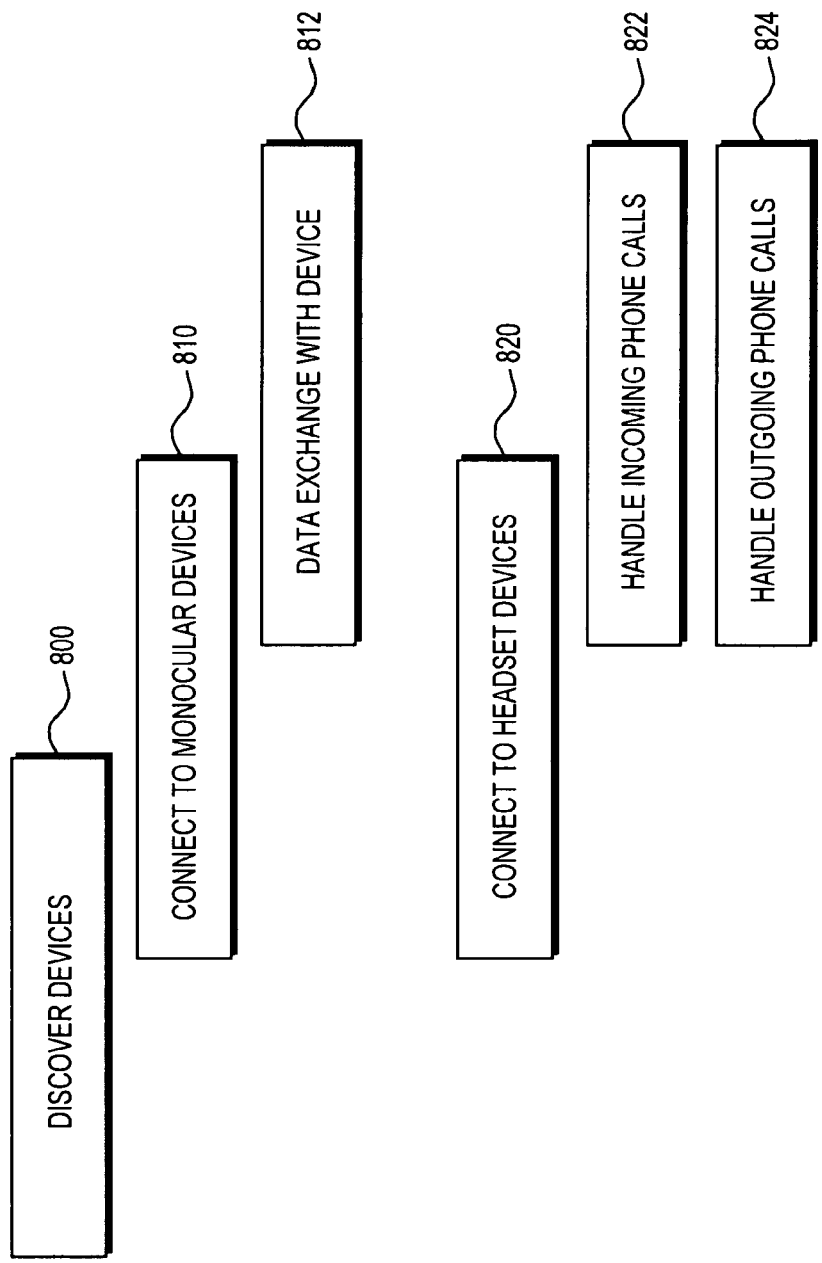

FIG. 8 illustrates a standard Bluetooth protocol stack implemented in the Bluetooth link 137 of FIG. 1, with the addition of a special proxy function. The Bluetooth™ layer does provide for discovery of Bluetooth™ devices 800 as in any standard Bluetooth™ device. However, headset devices 100 connected 810 will also provide for protocol information permitting data exchange with such devices 812. It can also connect to other types of headset devices 820, such as telephone headset devices which may provide for handling of incoming calls 822 and outgoing calls 824.

Figure 10:
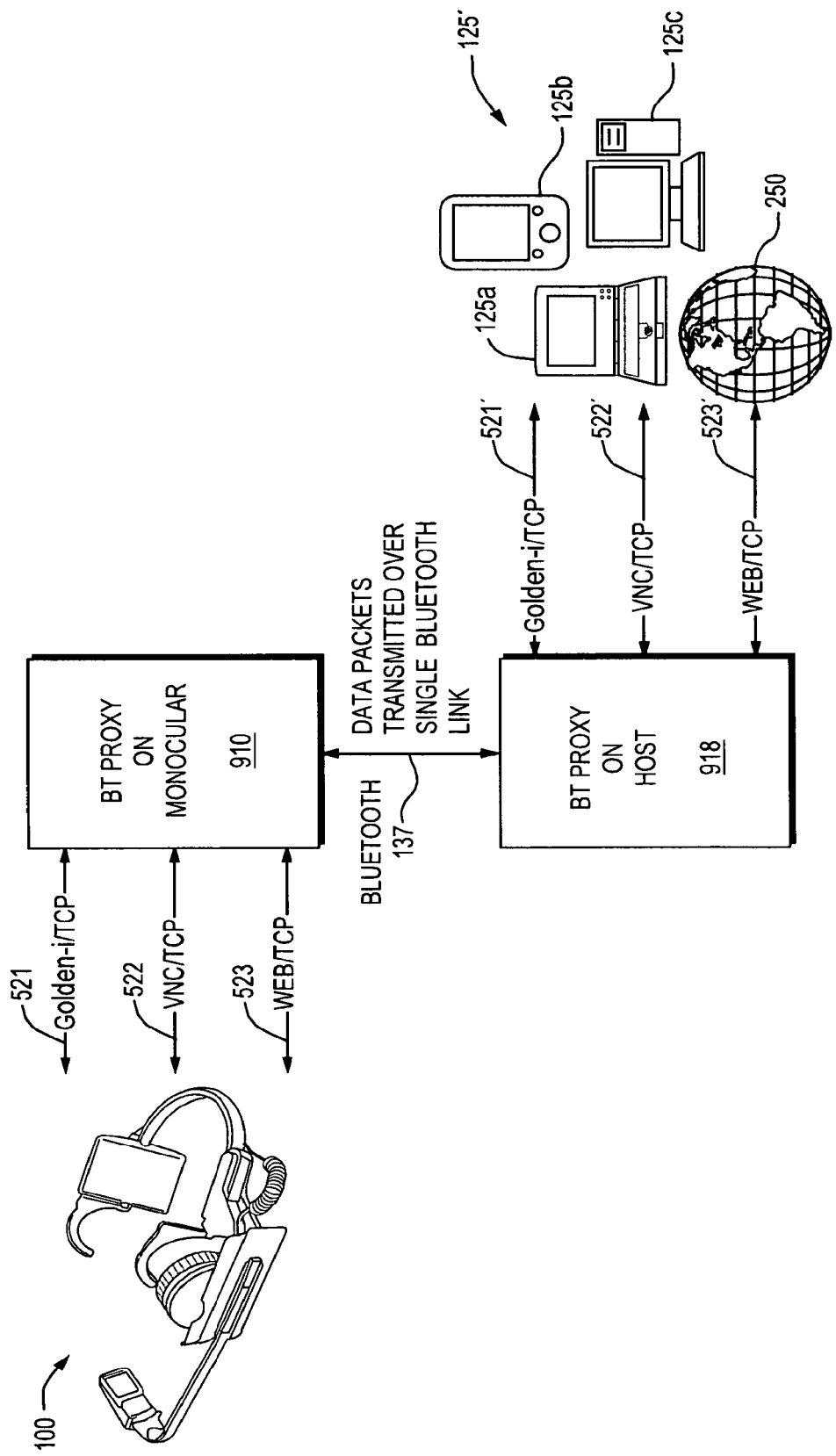

FIGS. 9A-9B and 10 show more detail of the proxy functionality provided by the Bluetooth™ interface 137.

FIG. 9A illustrates a traditional approach involving multiple direct TCP-layer connections to data sources. For example, each application running in the context of application browser 601 of FIG. 6, such as a speech recognition application 621, virtual network client 622, and a web browser client 623, might each require one or more TCP connections to the data sources provided by hosts 125'. Traditional systems involve multiple direct TCP connections to data sources.

FIG. 9B illustrates how, although Bluetooth™ itself does not provide any direct connection to the Internet 250 or other high layer networks, a connection between the monocular display device 100 and the internet 250 may be supported by a proxy 930 via an Internet enabled device 125. Bluetooth cannot connect directly to Internet; it must be proxied via an Internet enabled device. Thus, for example, applications such as the web browser 623 typically require host devices 125' to act as a networking proxy.

FIG. 10 illustrates a preferred arrangement in which a single Bluetooth link 137 supports multiple applications 621-623. The multiple application 621-623 require that the single Bluetooth™ connection 137 support multiple sockets, such as Transmission Control Protocol (TCP) connections. For example, while each application 621-623 might otherwise require multiple TCP connections, instead the Bluetooth™ proxy layer 1010 added between the standard Bluetooth™ layer and regular TCP protocol layer funnels the multiple requested TCP connections onto a single socket. The single socket provided by Bluetooth™ link 137 then transports the multiple connections to the host.

A similar inverse functionality 1018 provided on the host side 125 to unravel packets to their respective connection 621'-623'.

While Bluetooth™ itself does allow for multiple connection sockets between a host and client, many mobile phone operators impose a single connection limit. Thus, a single connection limit must be observed in many instances. This permits not only greater security, but avoids the possibility of having a wireless device be swamped with Bluetooth™ connection requests.

This approach also permits a standard web browser application 623, for example, to operate without requiring modification to its use of TCP sockets. Thus, the operation of the Bluetooth proxy 1010 provided on the client 100 and proxy function 1018 provided on the hosts 125 insulate the applications 621-623 running within application browser 601 and also insulate the applications running on hosts 125 from such modified socket functionality. For example, the virtual network running on the host 125 now need not be modified.

Figure 11:
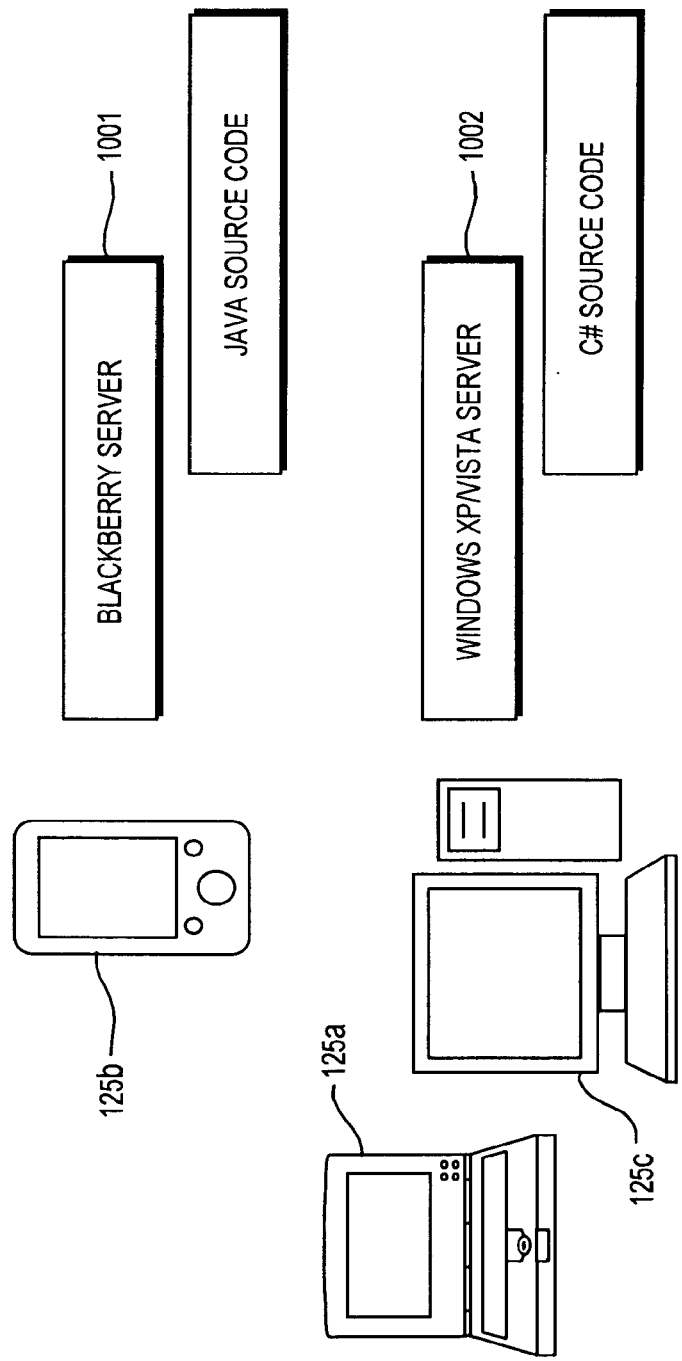
FIG. 11 is a block diagram illustrating device drivers.

FIG. 11 illustrates device drivers provided to insulate the device application browser 601 from having to know specifics of content format for particular host devices. Thus, for example, a Blackberry server 1101 is provided for a Blackberry host 125b, and a Windows Vista server 1102 is provided for a Windows machine host 125c. This allows the user interface specifics for particular hosts 125 to be presented as a generic interface to the wireless headset device 100. The servers 1101, 1102 provide at least two functionalities, including the Bluetooth™ proxy functionality 1118 of FIG. 10 (i.e., unpacking TCP channel data into multiple required channels) and a content server.

Figure 12:
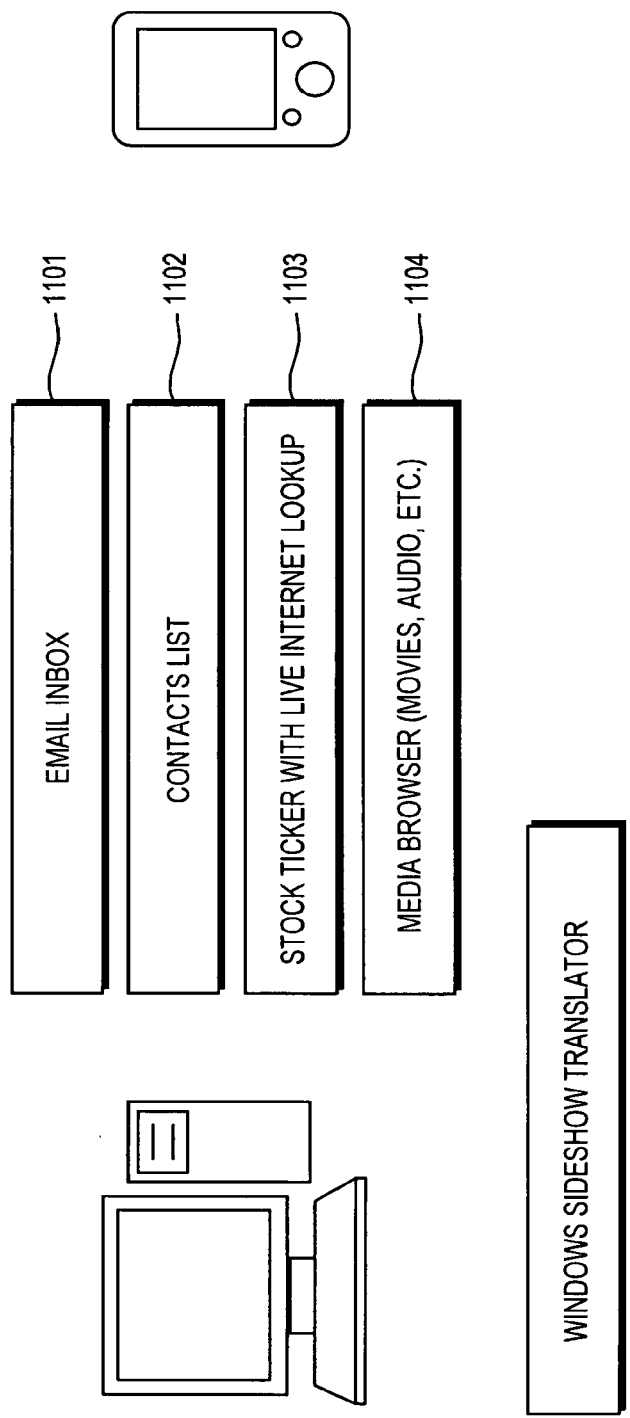
FIG. 12 is a block diagram illustrating device content.

FIG. 12 illustrates processing of device content by the servers 1101, 1102. These may include a content format piece for each type of respective content including email inbox 1201, contact list 1202, stock ticker 1203, media browser 1204 and the like. Each of these server functionalities 1201-1204 reformats its content using a page markup language. The page markup language can then be interpreted by the content browser 601 on the video headset device. The content browser 601 may now interpret the page markup language generically to fit the various requirements of the video headset device 100.

In alternate embodiments, a function such as a Windows Sideshow™ server may take formatted content from a Windows device and format it according to Sideshow requirements. Windows Sideshow is a technology introduced with the Windows Vista release of the Microsoft® operating system that enables Windows PC to drive a variety of auxiliary display devices connected to a main PC. These devices can be separate from or integrated in to the main PC, e.g., and display embedded on the outside of the laptop lid, etc.

With the virtual network and/or sideshow functionality, the wireless headset device can also become a "chameleon", in effect taking on the same user screen, same graphical user interface, and familiar user control of the host device. Even if the device 100 accepts several hosts at the same time (i.e., a blackberry, a cell phone, and a PC), the user is permitted to switch between the host devices. Each time a user makes such a switch, the user can see and still recognize the familiar slave or host and device user screen, the same graphical user interface (GUI), and same familiar controls and commands.

It is thus now understood how content can be viewed by the portable video headset 100 in different ways, all selectable by the user, including:
new applications written for the device itself; device applications, web applications, a web browser, etc.; and
Microsoft Sideshow applications, or native applications via a virtual network connection.

With the Bluetooth proxy support, the effect of pushing through original hosted device GUI interface, screens, command and control interfaces, can be supported for multiple devices at the same time.

While this invention has been particularly shown and described with references to example embodiments thereof, it will be understood by those skilled in the art that various changes in form and details may be made therein without departing from the scope of the invention encompassed by the appended claims.

What is claimed is:

1. A device comprising:
a portable, miniature display with an audio playback device configured to display a multimedia output of an application running on a host computing device based on received data in a generic format, the generic format being independent from a format of the host computing device;

an input device configured to receive a control signal including a request to control the application running on the host computing device; and a wireless interface configured to:
(i) establish a wireless connection between the device and the host computing device, (ii) convert the received control signal into a reformatted control signal having a control format that the host computing system can receive;
(iii) transmit the reformatted control signal over the wireless connection to the host computing device, wherein the reformatted control signal controls the application running on the host computing device and
(iv) receive data representative of the multimedia output of the application running on the host computing device in the format of the host computing device, the application being remotely controlled by the received control signal, wherein the portable, miniature display with an audio playback device is further configured to reformat the data using a device driver associated with the host computing device, such that the data is always presented to the portable, miniature display with an audio playback device in the generic format independent from the format of the host computing device, and the data is representative of the multimedia output of the application running on the host computing device from the generic format to the multimedia output in an expected format of the portable, miniature display with an audio playback device and further configured to remotely display the multimedia output of the application running on the host computing device.

2. The device of claim 1 wherein the wireless connection between the device and the host computing device further supports Microsoft Windows Sideshow, Remote Desktop Protocol (RDP), or Virtual Network Computing (VNC) protocols.

3. The device of claim 1 further comprising an input device configured to wirelessly communicate with the host computing device.

4. The device of claim 1 wherein the wireless interface is configured to support one or more of Institute of Electrical and Electronics Engineers (IEEE) 802.11 (Wi-Fi™) IEEE 802.15 (Bluetooth™), Wireless Universal Serial Bus (WUSB), Ultra Wide band (UWB), Wireless High Definition (WirelessHD), Wireless High Definition Multimedia Interface (WHDMI), or cellular protocols.

5. The device of claim 1 wherein the multimedia output provided from the host computing device is selected from at least one of: broadcast video, broadcast television, broadcast radio, Internet access, audio, video, text, images, satellite service, or closed circuit communications.

6. The device of claim 1 wherein the host computing device is at least one of a laptop computer, desktop computer, mobile telephone, cellular telephone, personal digital assistant (PDA), radio, satellite receiver, music player, video player, multimedia player, global positioning system (GPS) device, diagnostic computing device, and smart phone.

7. The device of claim 1 wherein the portable, miniature display with an audio playback device acts as a redundant auxiliary display screen for a computing device using an input device in a master-slave networking relationship.

8. A display method comprising:
establishing a wireless connection between a device and a host computing device;
generating, based on an input device, a control signal including a request for multimedia output of an application running on a host computing device based on received data in a generic format, the generic format being independent from a format of the host computing device;
converting the control signal into a reformatted control signal having a control format that the host computing system can receive;
transmitting the reformatted control signal from the device to the host computing device, the reformatted control signal controlling the application running on the host computing device;
receiving data representative of the multimedia output of the application running on host computing device in the format of the host computing device, the application being remotely controlled by the received control signal;
reformatting the data using a device driver associated with the host computing device, such that the data is always presented to a portable, miniature display with an audio playback device of the device in the generic format independent from the format of the host computing device, and the data is representative of the multimedia output of the application running on the host computing device from the generic format to the multimedia output in an expected format of the portable, miniature display with an audio playback device; and
remotely displaying, at the portable, miniature display with an audio playback device of the device, the multimedia output of the application running on the host computing device.

9. The method of claim 8 wherein the wireless connection between the device and the host computing device supports Microsoft Windows SideShow, Remote Desktop Protocol (RDP), or Virtual Network Computing (VNC) protocols, the method further comprising displaying the multimedia output according to the protocols.

10. The method of claim 8 further comprising controlling the host computing device wirelessly via an input device.

11. The method of claim 8 further comprising supporting communications over the wireless interface employing one or more of Institute of Electrical and Electronics Engineers (IEEE) 802.11 (Wi-Fi™), IEEE 802.15 (Bluetooth™), Wireless Universal Serial Bus (WUSB), Ultra Wide band (UWB), Wireless High Definition (WirelessHD), Wireless High Definition Multimedia Interface (WHDMI), or cellular protocols.

12. The method of claim 8 wherein the multimedia output displayed is selected from a group consisting of: broadcast video, broadcast television, broadcast radio, Internet access, audio, video, text, images, satellite service, or closed circuit communications.

13. The method of claim 8 wherein the host computing device is a laptop computer, desktop computer, mobile telephone, cellular telephone, personal digital assistant (PDA), radio, satellite receiver, music player, video player, multimedia player, global positioning system (GPS) device, diagnostic computing device, or smartphone.

14. The method of claim 8 wherein the portable, miniature display with an audio playback device acts as a redundant auxiliary display screen for a computing device using an input device in a master-slave networking relationship.

15. A system comprising:
a device including:
(a) a portable, miniature display with an audio playback device configured to display multimedia output of an application running on a host computing device based on received data in a generic format, the generic format being independent from a format of the host computing device, (b) an input device configured to receive a control signal including a request to control the application running on the host computing device, and (c) a first wireless interface configured to:
   (i) establish a wireless connection between the device and the host computing device,
   (ii) convert the received control signal into a reformatted control signal having a control format that the host computing system can receive;
   (iii) transmit the reformatted control signal to the host computing device wherein the reformatted control signal controls the application running on the host computing device, and
   (iv) receive data representative of the multimedia output of the application running on the host computing device in the format of the host computing device, the application being controlled by the received control signal;

wherein the host computing device includes a host display interface and a second wireless interface, the second wireless interface configured to (i) establish the wireless connection between the device and the host computing device, (ii) receive the control signal from device, and (iii) transmit the data representative of the multimedia output of the application running on the host computing device, wherein the host computing device is configured to control the application with the received control signal and provide the data representative of the multimedia output of the application running on the host computing device, the multimedia output of the application running on the host computing device being additionally reformatted by the host display interface using a device driver associated with the host computing device, such that the data is always presented to the portable, miniature display with an audio playback device in an expected format independent from the format of the host computing device, and the data is from the generic format to the multimedia output in an expected format and displayed at the host display interface.

16. The system of claim 15 further comprising a first host computing device and a second host computing device of the host computing device, the first wireless interface configured to establish a first wireless communication path with the second wireless interface of the first host computing device and a second wireless communication path with a third wireless interface of the second host computing device.

17. The system of claim 16 wherein the first wireless interface is further configured to establish the first and second wireless communication paths employing protocols, standard or modified, providing simultaneous communication over a plurality of channels with a variable bit rate and a variable buffer.

18. The system of claim 15 wherein the first wireless interface is further configured to receive the data representative of the multimedia output by receiving a markup language as the data, and
   wherein the display is further configured to convert the data representative of the multimedia output, including the markup language, to the multimedia output of the application for displaying.

19. The system of claim 15 wherein the host computing device is further configured to operates a utility to provide multimedia output to the device at a time of operation of the host computing device in a state of power of on, off, or reduced-power sleep mode, and therein the display is further configured to access the utility of the host computing device to receive the multimedia output.

20. The system of claim 19 wherein the utility operates remotely without requiring user interaction with the host computing device through protocols, such as Remote Desktop Protocol (RDP), Virtual Network Computing (VNC), and commercial services, such as GoToMyPC.

* * * * *